United States Patent
Jiang et al.

(10) Patent No.: US 9,790,417 B1
(45) Date of Patent: *Oct. 17, 2017

(54) HIGH-DENSITY WATER-BASED DRILLING FLUID SUITABLE FOR HORIZONTAL SHALE GAS WELLS

(71) Applicant: CHINA UNIVERSITY OF PETROLEUM (BEIJING), Beijing (CN)

(72) Inventors: Guancheng Jiang, Beijing (CN); Yinbo He, Beijing (CN); Fan Liu, Beijing (CN); Lili Yang, Beijing (CN); Xianmin Zhang, Beijing (CN); Deli Gao, Beijing (CN); Xianzhu Wu, Beijing (CN); Guangchang Ma, Beijing (CN); Gang Qu, Beijing (CN); Li Zhao, Beijing (CN); Haifang Sun, Beijing (CN); Wei Ou'yang, Beijing (CN); Junbin Chen, Beijing (CN); Jienian Yan, Beijing (CN); Liexiang Han, Beijing (CN); Chunyao Peng, Beijing (CN)

(73) Assignee: China University of Petroleum (Beijing), Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/489,193

(22) Filed: Apr. 17, 2017

(30) Foreign Application Priority Data

May 20, 2016 (CN) .......................... 2016 1 0340484
Jan. 18, 2017 (CN) .......................... 2017 1 0038133

(51) Int. Cl.
*C09K 8/12* (2006.01)
*C09K 8/035* (2006.01)

(52) U.S. Cl.
CPC ................ *C09K 8/12* (2013.01); *C09K 8/035* (2013.01); *C09K 2208/10* (2013.01); *C09K 2208/12* (2013.01)

(58) Field of Classification Search
CPC .......... E21B 21/068; E21B 21/00; E21B 7/00; E21B 43/267; C09K 8/32; C09K 8/36; C09K 17/16; C09K 8/035; C09K 8/12; C09K 8/516; C09K 17/22; C09K 8/5083; C09K 8/60; C09K 8/92; C09K 8/35; C09K 8/34; C09K 8/426; C09K 8/467; C09K 2208/10; C09K 2208/08; C09K 2208/22; C09K 8/44; C09K 8/508; C09K 8/52; C09K 8/68; C09K 8/88; Y10S 507/903
See application file for complete search history.

(56) References Cited

U.S. PATENT DOCUMENTS

| 5,167,766 | A | * | 12/1992 | Honig | .................... D21H 21/54 162/164.1 |
| 9,267,068 | B1 | | 2/2016 | Jiang et al. | |
| 9,296,936 | B1 | * | 3/2016 | Jiang | ........................ C09K 8/03 |
| 9,528,042 | B1 | | 12/2016 | Jiang et al. | |
| 2013/0045901 | A1 | * | 2/2013 | Bicerano | ................ B82Y 30/00 507/231 |
| 2016/0053156 | A1 | | 2/2016 | Jiang et al. | |
| 2016/0230063 | A1 | | 8/2016 | Jiang et al. | |
| 2016/0333248 | A1 | | 11/2016 | Jiang et al. | |

FOREIGN PATENT DOCUMENTS

| CN | 101818050 | A | | 9/2010 |
| CN | 104177517 | A | | 12/2014 |
| CN | 104628931 | | * | 5/2015 |
| CN | 104650823 | | * | 5/2015 |
| CN | 104789195 | A | | 7/2015 |
| CN | 104946216 | | * | 9/2015 |
| CN | 104946216 | A | | 9/2015 |
| CN | 105441038 | | * | 3/2016 |

OTHER PUBLICATIONS

Yuxiu An et al, Synthesis of nano plugging agent based on AM/AMPS/NVP terpolymer, Journal of Petroleum Science and Engineering, 135, 2015, 505-514.*
Liu et al., "Study on High Salt-Tolerant and Uniform Polymer Microspheres as Profile-Control and Oil-Displacement Agent", Journal of Oil and Gas Technology Oct. 2014 vol. 36 No. 10, pp. 189-195, English Abstract.
Lin et al., "Research on Application of Nano-Plugging Agent in Drilling Fluid", Applied Chemical Industry Apr. 2016 vol. 45 No. 4, pp. 742-746, (English Abstract).

* cited by examiner

*Primary Examiner* — Kumar R Bhushan
(74) *Attorney, Agent, or Firm* — Calfee, Halter & Griswold LLP

(57) ABSTRACT

The present invention relates to the well drilling field in petrochemical industry, and discloses a high-density water-based drilling fluid suitable for horizontal shale gas wells comprising a nano-plugging agent, a bionic wall bracing agent, a bionic shale inhibitor, a filler, an emulsifier, and an amphiphobic wettability reversal agent, wherein, the nano-plugging agent is modified silicon dioxide nano-particle, and its modifying group includes a modifying copolymer chain; the bionic wall bracing agent is carboxymethyl chitosan with a dopamine-derived group grafted on its main chain; the bionic shale inhibitor is composed of structural units of arginine and structural units of lysine; the filler consists of calcium carbonate of 1,600-2,500 mesh, calcium carbonate of 1,050-1,500 mesh, and calcium carbonate of 500-1,000 mesh at a weight ratio of 1:0.55-6:0.55-6; and the amphiphobic wettability reversal agent is a dual-cation fluorocarbon surfactant. The drilling fluid provided herein is suitable for use in shale gas mining.

20 Claims, 1 Drawing Sheet

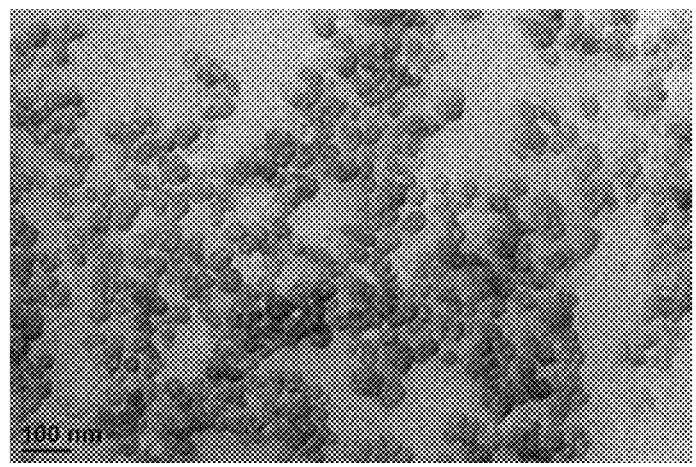

HIGH-DENSITY WATER-BASED DRILLING FLUID SUITABLE FOR HORIZONTAL SHALE GAS WELLS

CROSS REFERENCE TO RELATED APPLICATIONS

This application claims priorities to Chinese Application No. 201610340484.3, filed on May 20, 2016, entitled "High-Density Water-Based Drilling Fluid Suitable for Horizontal Shale Gas Wells", and Chinese Application No. 201710038133.1, filed on Jan. 18, 2017, entitled "Dual-cation Fluorocarbon Surfactant and Preparation Method thereof, and Its Use As Amphiphobic Wettability Reversal Agent and Drilling Fluid and Its Use", which are specifically and entirely incorporated by reference.

FIELD OF THE INVENTION

The present invention relates to the well drilling field in petrochemical industry, in particular to a high-density water-based drilling fluid suitable for horizontal shale gas wells.

BACKGROUND OF THE INVENTION

As the energy consumption is heavier increasingly, the exploitation and utilization of non-conventional energy resources, such as shale gas and shale oil, etc., receives attention gradually. The explored shale oil and gas reservoir in China is huge, and is of great value for exploration and development. At present, a multi-staged fracturing method is mainly used in long horizontal wells for shale gas mining, in order to improve well yield and industrial exploitation value. Owing to the fact that the shale formation has high water sensitivity and developed crevices, complicated situations such as wall collapse and bore shrinkage, etc. may occur in the drilling process. Therefore, the wall stability problem of long horizontal wells is a major technical difficulty encountered in the development of drilling fluids and completion fluids for shale gas mining.

At present, oil-based drilling fluids are mainly employed for horizontal wells in shale formation, and such oil-based drilling fluid can solve the well wall stability problem satisfactorily. However, the well yield of shale gas is usually low, and the cost of oil mud is high, causing compromised industrial value of shale gas mining; in addition, oil-based drilling fluids have problems including poor environmental protection property, high recycling cost, and poor safety, etc. Water-based drilling fluids have advantages including lower cost, more environment friendly, and easy access to the oil and gas reservoir, etc.; however, common water-based drilling fluid systems have poor well wall stability performance and inadequate lubrication and anti jamming capability. Consequently, the application of water-based drilling fluids in shale oil and gas exploitation is limited.

In China, most of the shale gas reservoirs are buried deeply (e.g., the Lower Cambrian Series shale gas formation in Sichuan Basin is in 2,000-3,500 m burial depth), have high formation pressure, and involve complex formations, including super-high pressure hydrocarbon formation, salt-water formation, and argillaceous rock formation, etc. When a shale formation that has high gas content and highly developed crevices is encountered during well drilling, the severely increased gas leakage may result in accidents such as well blowout and well kick, etc. By increasing the density of the drilling fluid, the formation pressure may be balanced effectively, the well wall stability can be improved, and the occurrence of complex situations can be prevented.

SUMMARY OF THE INVENTION

At present, water-based drilling fluids suitable for shale gas mining are not satisfactory yet, mainly in the following aspects:
(1) The high-temperature resistance performance has to be improved. As the well depth and the downhole temperature increase, the requirement for temperature resistance performance of water-based drilling fluid becomes higher.
(2) The density is not high generally. Water-based drilling fluids with ordinary density can't meet the requirement for drilling fluid density in high-pressure formations any more, but increased drilling fluid density may bring problems, such as poor rheological property.
(3) The inhibition performance is not enough. Conventional water-based drilling fluids can't well inhibit the dispersion of shale any more, and may result in wellbore instability, but increased inhibition performance may bring problems such as poor rheological property and plugging performance.
(4) The plugging performance is not enough. Water-based drilling fluids with ordinary density can't fully plug micrometer pores in shale any more.

To overcome the drawbacks of the existing water-based drilling fluids, including low density, poor temperature resistance, plugging and inhibition performance, etc., the present invention provides a water-based drilling fluid, which has higher density, and higher temperature resistance, plugging and inhibition performance.

To attain the object described above, the present invention provides a water-based drilling fluid, which comprising a nano-plugging agent, a bionic wall bracing agent, a bionic shale inhibitor, a filler, an emulsifier, and an amphiphobic wettability reversal agent, wherein
the nano-plugging agent is modified silicon dioxide nano-particle, the modifying group on the modified silicon dioxide nano-particle includes a modifying copolymer chain, and the structural units in the modifying copolymer chains are provided by one or more of monomers represented by the following formula (1) and one or more of monomers represented by the following formula (2):

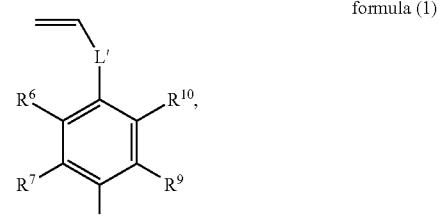

formula (1)

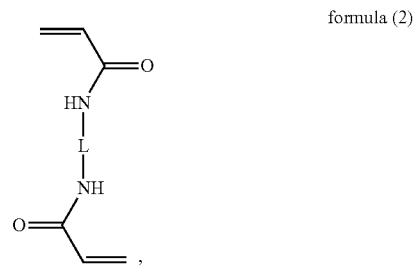

formula (2)

wherein one of $R^6$-$R^{10}$ is $SO_3H$ and the rest of $R^6$-$R^{10}$ are independently selected from H, —OH, halogen, and C1-C10 alkyl; L, L' and L" are independently selected from C0-C10 alkylene;

the bionic wall bracing agent is carboxymethyl chitosan with a dopamine-derived group represented by the following formula (I-1) grafted on its main chain:

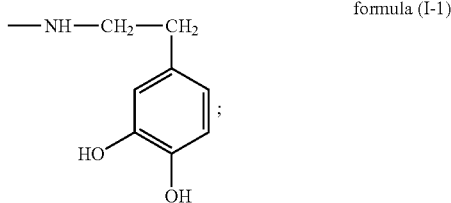

formula (I-1)

the bionic shale inhibitor is composed of structural units represented by the following formula (3) and structural units represented by the following formula (4):

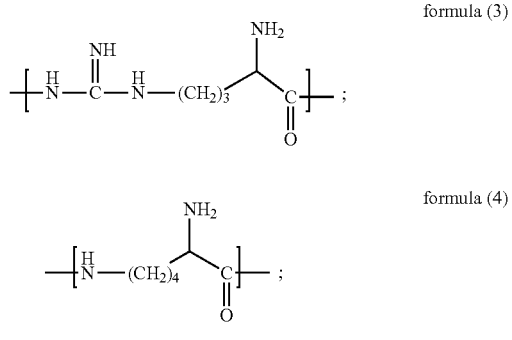

formula (3)

formula (4)

the molar ratio of the structural units represented by formula (3) to the structural units represented by formula (4) is 0.2-6:1, and the weight-average molecular weight of the bionic shale inhibitor is 800-4,000 g/mol;

the filler consists of calcium carbonate of 1,600-2,500 mesh, calcium carbonate of 1,050-1,500 mesh, and calcium carbonate of 500-1,000 mesh at a weight ratio of 1:0.55-6: 0.55-6;

the emulsifier is one or more of compounds represented by the following formula (i):

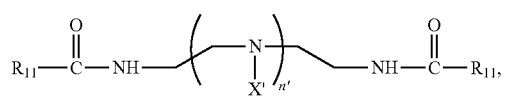

formula (i)

in formula (i), each of the two $R_{11}$ groups is independently selected from C14-C30 alkyl optionally substituted by group Y and C14-C30 unsaturated alkyl with carbon-carbon double bonds optionally substituted by group Y, and the group Y is independently selected from the groups represented by the following formulae:

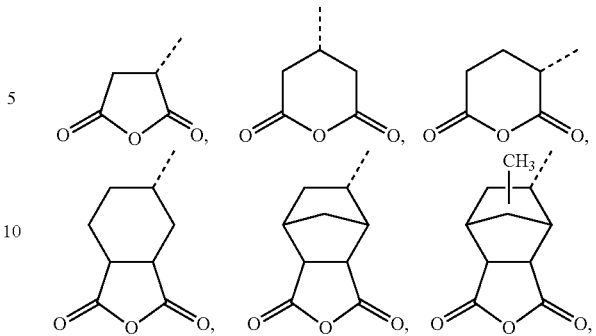

n' is an integer within a range of 1-8;

n' X'-es are independently selected from H and —C(O)—$R_{21}$, and at least one X' is —C(O)—$R_{21}$, $R_{21}$ is selected from carboxyl, C1-C6 alkyl, C3-C8 cycloalkyl, C1-C6 alkyl substituted by carboxyl, C3-C8 cycloalkyl substituted by carboxyl, C3-C8 cycloalkyl substituted by carboxyl and C1-C4 alkyl, C2-C6 unsaturated alkyl with a carbon-carbon double bond, C3-C8 unsaturated cycloalkyl with a carbon-carbon double bond, C2-C6 unsaturated alkyl with a carbon-carbon double bond substituted by carboxyl, and C3-C8 unsaturated cycloalkyl with a carbon-carbon double bond substituted by carboxyl and C1-C4 alkyl; and the amphiphobic wettability reversal agent is a dual-cation fluorocarbon surfactant of which the cation part is represented by the following formula (a):

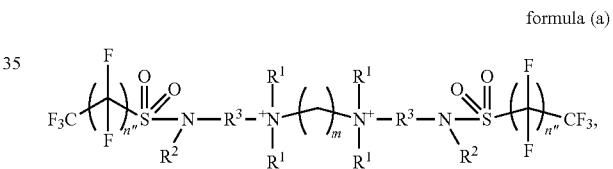

formula (a)

wherein, each $R^1$ is independently selected from C1-C6 alkyl, each $R^2$ is independently selected from H and C1-C6 alkyl, each $R^3$ is independently selected from C1-C10 alkylene, each n" is independently selected from integers within a range of 3-15, and m is selected from integers within a range of 1-10.

The water-based drilling fluid provided in the present invention has high temperature-resistance, high plugging and high inhibition performance, is environment friendly, especially has high density, and is especially suitable for horizontal shale gas well mining, and is a high-density water-based drilling fluid suitable for horizontal shale gas wells.

Other features and advantages of the present invention will be further detailed in the embodiments hereunder.

BRIEF DESCRIPTION OF DRAWINGS

The accompanying drawings are provided here to facilitate further understanding on the present invention, and constitute a part of this document. They are used in conjunction with the following embodiments to explain the present invention, but shall not be comprehended as constituting any limitation to the present invention. In the figures:

FIG. 1 is a SEM image of the modified silicon dioxide nano-particles obtained in the nano-plugging agent preparation example 1.

DETAILED DESCRIPTION OF THE EMBODIMENTS

Hereunder some embodiments of the present invention will be detailed. It should be appreciated that the embodiments described here are only provided to describe and explain the present invention, but shall not be deemed as constituting any limitation to the present invention.

The ends points and any value in the ranges disclosed in the present invention are not limited to the exact ranges or values. Instead, those ranges or values shall be comprehended as encompassing values that are close to those ranges or values. For numeric ranges, the end points of the ranges, the end points of the ranges and the discrete point values, and the discrete point values may be combined to obtain one or more new numeric ranges, which shall be deemed as having been disclosed specifically in this document.

The present invention provides a water-based drilling fluid, comprising a nano-plugging agent, a bionic wall bracing agent, a bionic shale inhibitor, a filler, an emulsifier, and an amphiphobic wettability reversal agent, wherein the nano-plugging agent is modified silicon dioxide nano-particle, the modifying group on the modified silicon dioxide nano-particle includes a modifying copolymer chain, and the structural units in the modifying copolymer chains are provided by one or more of monomers represented by the following formula (1) and one or more of monomers represented by the following formula (2):

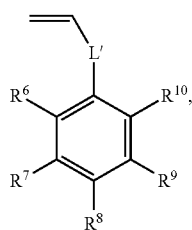

formula (1)

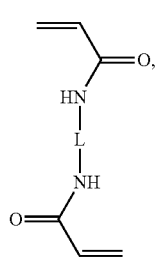

formula (2)

wherein one of $R^6$-$R^{10}$ is -L"-$SO_3H$ and the rest of $R^6$-$R^{10}$ are independently selected from H, —OH, halogen, and C1-C10 alkyl; L, L' and L" are independently selected from C0-C10 alkylene;

the bionic wall bracing agent is carboxymethyl chitosan with a dopamine-derived group represented by the following formula (I-1) grafted on its main chain:

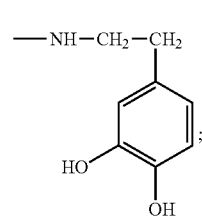

formula (I-1)

the bionic shale inhibitor is composed of structural units represented by the following formula (3) and structural units represented by the following formula (4):

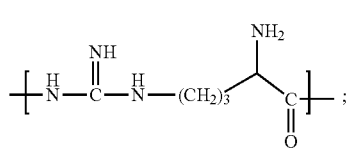

formula (3)

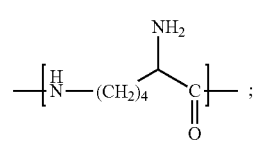

formula (4)

the molar ratio of the structural units represented by formula (3) to the structural units represented by formula (4) is 0.2-6:1, and the weight-average molecular weight of the bionic shale inhibitor is 800-4,000 g/mol;

the filler consists of calcium carbonate of 1,600-2,500 mesh, calcium carbonate of 1,050-1,500 mesh, and calcium carbonate of 500-1,000 mesh at a weight ratio of 1:0.55-6:0.55-6;

the emulsifier is one or more of compounds represented by the following formula (i):

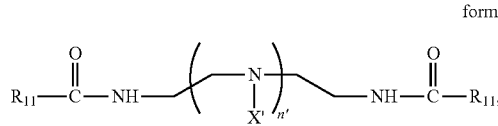

formula (i)

in formula (i), each of the two $R_{11}$ groups is independently selected from C14-C30 alkyl optionally substituted by group Y and C14-C30 unsaturated alkyl with carbon-carbon double bonds optionally substituted by group Y, and the group Y is independently selected from the groups represented by the following formulae:

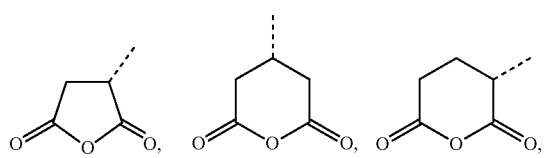

-continued

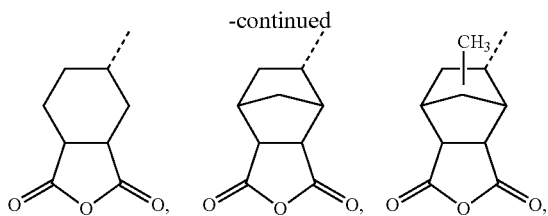

n' is an integer within a range of 1-8;

n' X'-es are independently selected from H and —C(O)—$R_{21}$, and at least one X' is —C(O)—$R_{21}$, $R_{21}$ is selected from carboxyl, C1-C6 alkyl, C3-C8 cycloalkyl, C1-C6 alkyl substituted by carboxyl, C3-C8 cycloalkyl substituted by carboxyl, C3-C8 cycloalkyl substituted by carboxyl and C1-C4 alkyl, C2-C6 unsaturated alkyl with a carbon-carbon double bond, C3-C8 unsaturated cycloalkyl with a carbon-carbon double bond, C2-C6 unsaturated alkyl with a carbon-carbon double bond substituted by carboxyl, and C3-C8 unsaturated cycloalkyl with a carbon-carbon double bond substituted by carboxyl and C1-C4 alkyl; and the amphiphobic wettability reversal agent is a dual-cation fluorocarbon surfactant of which the cation part is represented by the following formula (a):

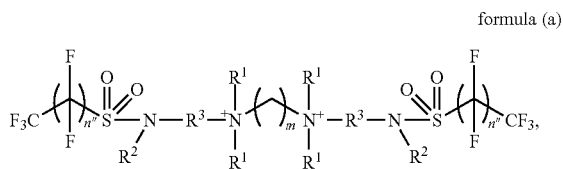

formula (a)

wherein, each R1 is independently selected from C1-C6 alkyl, each R2 is independently selected from H and C1-C6 alkyl, each $R^3$ is independently selected from C1-C10 alkylene, each n" is independently selected from integers within a range of 3-15, and m is selected from integers within a range of 1-10.

According to the present invention, though the nano-plugging agent, bionic wall bracing agent, bionic shale inhibitor, emulsifier, and amphiphobic wettability reversal agent may be used at any ratio and can attain the effects of improving temperature resistance, plugging, and inhibition performance of the drilling fluid and, stabilizing the well wall and protecting the reservoir. In order to enable the nano-plugging agent, bionic wall bracing agent, bionic shale inhibitor, emulsifier, and amphiphobic wettability reversal agent to work with each other in a better way. preferably the weight ratio of the nano-plugging agent to the bionic wall bracing agent to the bionic shale inhibitor to the emulsifier to the amphiphobic wettability reversal agent is 100:20-500:20-500:20-500:5-100, including 100:30-400:30-400:30-300:10-50, including 100:50-200:50-200:50-200:10-30, and may be 100:50-100:50-100:50-150:10-20.

According to the present invention, since the modifying groups on the modified silicon dioxide nano-particles include the modifying copolymer chains, it is equivalent to that the modifying copolymer chain is grafted on the nano-silicon dioxide; thereby, a spatial network structure attained by virtue of noncovalent bonds such as hydrophilic and hydrophobic groups and hydrogen bonds, etc. and the adsorptive effect of amido groups, so that the modified silicon dioxide nano-particles will not agglomerate easily or will not agglomerate into large-grained agglomerates but maintain high dispersity when the modified silicon dioxide nano-particles are used as plugging agent in a drilling fluid; therefore, when the drilling fluid is inserted into shale, the plugging agent can plug the crevices in the shale satisfactorily, and can work with other constituents in the drilling fluid, especially the bionic wall bracing agent, bionic shale inhibitor, emulsifier and amphiphobic wettability reversal agent in the drilling fluid, and particularly the filler disclosed in the present invention, to attain the purpose of improving the bearing capability of the formation, stabilize the well wall, prevent leakage from the well, and protect the oil and gas reservoir.

In certain embodiments, one of $R^6$-$R^{10}$ is -L"-$SO_3H$, and the rest of $R^6$-$R^{10}$ are independently selected from H, and C1-C6 alkyl; L, L' and L" are independently selected from C0-C6 alkylene.

In certain embodiments, one of $R^6$-$R^{10}$ is -L"-$SO_3H$, and the rest of $R^6$-$R^{10}$ are independently selected from H, and C1-C4 alkyl; L, L' and L" are independently selected from C0-C4 alkylene.

In certain embodiments, one of $R^6$-$R^{10}$ is -L"-$SO_3H$, and the rest of $R^6$-$R^{10}$ are independently selected from H, methyl, ethyl, propyl and butyl; L' and L" are independently selected from C0 alkylene, —$CH_2$—, —$CH_2$—$CH_2$—, —$CH_2$—$CH_2$—$CH_2$—, —$CH(CH_3)$—$CH_2$—, —$C(CH_3)_2$—$CH_2$—, —$CH_2$—$C(CH_3)_2$— and —$CH_2$—$CHCH_3$—$CH_2$—; L is —$CH_2$—, —$CH_2$—$CH_2$—, —$CH_2$—$CH_2$—$CH_2$—, —$CH(CH_3)$—$CH_2$—, —$C(CH_3)_2$—$CH_2$—, —$CH_2$—$C(CH_3)_2$— or —$CH_2$—$CHCH_3$—$CH_2$—. C0 alkylene means that the groups at the two ends of L, L' or L" are directly linked, or may be understood as that L, L' or L" doesn't exist or is a linking bond. Optimally, $R^8$ is -L"-$SO_3H$.

Wherein, examples of -L"-$SO_3H$ may include: —$SO_3H$, —$CH_2$—$SO_3H$, —$CH_2$—$CH_2$—$SO_3H$, —$CH_2$—$CH_2$—$CH_2$—$SO_3H$, —$CH(CH_3)$—$CH_2$—$SO_3H$, —$C(CH_3)_2$—$CH_2$—$SO_3H$, —$CH_2$—$C(CH_3)_2$—$SO_3H$ or —$CH_2$—$CHCH_3$—$CH_2$—$SO_3H$.

Wherein, examples of the C1-C10 alkyl may include: methyl, ethyl, propyl, isopropyl, butyl, isobutyl, sec-butyl, tert-butyl, amyl, hexyl, heptyl, octyl, nonyl, and decyl.

In certain embodiments, the monomers represented by formula (1) are selected from one or more of compounds represented by the following formulae:

formula (1-1): in the formula (1), $R^8$ is —$SO_3H$, $R^6$-$R^7$ and $R^9$-$R^{10}$ are H, and L' is C0 alkylene (also referred to as p-styrenesulfonic acid);

formula (1-2): in the formula (1), $R^6$ is —$SO_3H$, $R^7$-$R^{10}$ are H, and L' is C0 alkylene (also referred to as o-styrenesulfonic acid);

formula (1-3): in the formula (1), $R^7$ is —$SO_3H$, $R^6$ and $R^8$-$R^{10}$ are H, and L' is C0 alkylene (also referred to as m-styrenesulfonic acid);

formula (1-4): in the formula (1), $R^8$ is —$SO_3H$, $R^7$ is methyl, $R^6$ and $R^9$-$R^{10}$ are H, and L' is C0 alkylene (also referred to as p-2-methyl-4-styrenesulfonic acid).

In certain embodiments, the monomers represented by formula (2) are selected from one or more of compounds represented by the following formulae:

formula (2-1): in the formula (2), L is —$CH_2$— (also referred to as N,N'-methylene-bis acrylamide);

formula (2-2): in the formula (2), L is —$CH_2$—$CH_2$— (also referred to as N,N'-ethylidene-bis acrylamide).

In certain embodiments, the structural units in the modifying copolymer chain is composed of one or more of structural units represented by the following formula (1-a) and structural units represented by the following formula (2-a):

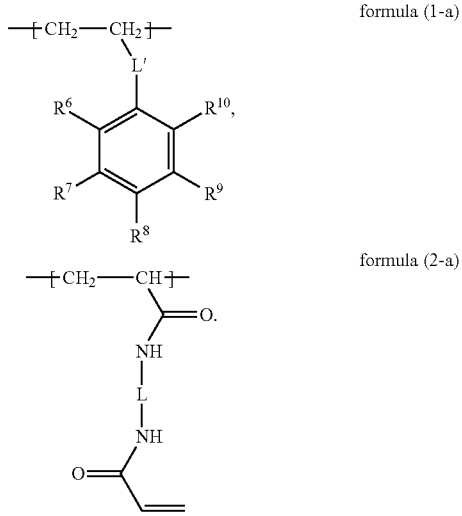

formula (1-a)

formula (2-a)

Wherein, $R^6$-$R^{10}$, L, L' and L'' are those as defined above. In certain embodiments, the modifying copolymer chain is a linear copolymer chain consisting of one or more of the structural units represented by formula (1-a) and one or more of the structural units represented by formula (2-a), and may be a random linear copolymer chain, or a block linear copolymer chain, or an alternating linear copolymer chain. There is no particular restriction on the specific structure of the linear copolymer chain. However, for convenience, preferably the linear copolymer chain is a random linear copolymer chain.

Wherein, the structural units represented by formula (1-a) and the structural units represented by formula (2-a) may be selected preferably depending upon the monomers represented by formula (1) and the monomers represented by formula (2) described above respectively.

According to the present invention, as long as the modifying copolymer chain consists of the structural units provided by the monomers represented by formula (1) and the structural units provided by the monomers represented by formula (2), the modifying copolymer chain can be used as the modifying group on the silicon dioxide nano-particles to modify the surfaces of the silicon dioxide nano-particles, so as to avoid a phenomenon that the silicon dioxide nano-particles agglomerate into large-grain agglomerates when they are used as a nano-plugging agent in a drilling fluid and give play to the plugging effect of the modified silicon dioxide nano-particles; however, in order to enable the modified silicon dioxide nano-particles to have better ion compatibility (mainly evaluated by observing the cooperating effect with other drilling fluid additives), better high temperature stability, and better salt resistance property when the modified silicon dioxide nano-particles are used as a nano-plugging agent, and thereby work with the bionic wall bracing agent, bionic shale inhibitor, emulsifier, hydrophobic and oleophobic wettability reversal agent, and particularly the filler disclosed in the present invention in the drilling fluid in a better way to reduce filter loss of the drilling fluid, attain a favorable plugging effect, and solve wellbore instability problems during well drilling, preferably, in the modifying copolymer chain, the molar ratio of the structural units provided by the monomers represented by formula (1) to the structural units provided by the monomers represented by formula (2) is 1:0.5-5, including 1:1-2, including 1:1.3-1.6, including 1:1.5-1.6.

According to the present invention, the molecular weight of the modifying copolymer chain may vary within a wide range, as long as the above-mentioned effect can be attained; preferably, the weight-average molecular weight of the modifying copolymer chain is 100,000-2,500,000 g/mol, including 300,000-1,800,000 g/mol, including 500,000-1,600,000 g/mol, including 650,000-1,400,000 g/mol, including 700,000-1,300,000 g/mol, including 800,000-1,300,000 g/mol, and may be 860,000-1,280,000 g/mol, for example. If the weight-average molecular weight of the modifying copolymer chain is within the above-mentioned ranges, especially within the preferred ranges, the modified silicon dioxide nano-particles have excellent performance when they are used as a nano-plugging agent.

According to the present invention, the content of the modifying copolymer chains on the modified silicon dioxide nano-particles may vary within a wide range, as long as a nano-plugging agent with excellent performance can be obtained; preferably, based on the total weight of the modified silicon dioxide nano-particles, the content of the modifying copolymer chains is 60 wt % or higher, including 85 wt % or higher, including 90 wt % or higher, including 90-98 wt %, including 90-95 wt %.

According to the present invention, the size of the modified silicon dioxide nano-particles may be adjusted according to the crevice condition of the rock stratum; however, it is common knowledge in the art that the average pore throat size of mud shale is usually within a range of 10-30 nm; since the modified silicon dioxide nano-particles in the present invention can be dispersed well in the drilling fluid and will not agglomerate into large agglomerated particles when they are used as plugging agent, the modified silicon dioxide nano-particles in the present invention may have a wide range of particle diameter, and can attain a good plugging effect even within the wide range of particle diameter. Thus, preferably, the particle diameter of the modified silicon dioxide nano-particles is 3-30 nm, including 10-30 nm.

According to the present invention, the modified silicon dioxide nano-particles that serve as a nano-plugging agent may be prepared with a conventional method in the art; preferably, the method for preparing the modified silicon dioxide nano-particles is as follows:

(1) subjecting one or more of monomers represented by formula (1) and one or more of monomers represented by formula (2) to have a contact reaction with silicon dioxide nano-particles, in the presence of a monohydric alcohol and a coupler;

(2) subjecting the product of the contact reaction to have a polymerization reaction, in the presence of a redox initiator system.

According to the present invention, formulae (1) and (2) and the groups involved in them are those as described above, and will not be detailed further here.

According to the present invention, in the step (1) in the method for preparing the modified silicon dioxide nano-particles, there is no particular restriction on the amount of the monomers represented by formulae (1) and (2), which is to say, the amount may be selected according to the modified silicon dioxide nano-particles described above. For example, to obtain the modifying copolymer chain consisting of structural units at a certain molar ratio described above and obtain the modifying copolymer chain with appropriated molecular weight described above, preferably the molar ratio of the monomers represented by formula (1) to the monomers represented by formula (2) is 1:0.5-5, including 1:1-2, including 1:1.3-1.6, including 1:1.5-1.6. For example, to make the modified silicon dioxide nano-particles modified by the modifying copolymer chains described above, preferably, based on the total amount of the silicon dioxide nano-particles, the monomers represented by formula (1) and the monomers represented by formula (2), the total amount of the monomers represented by formula (1) and the monomers represented by formula (2) is 60 wt. % or higher, including 85 wt. % or higher, including 90 wt. % or higher, including 90-98 wt. %, including 90-95 wt. %; in other words, the content of the silicon dioxide nano-particles is 40 wt. % or lower, including 25 wt. % or lower, including 10 wt. % or lower, including 2-10 wt. %, and may be 5-10 wt. %, for example.

According to the present invention, in the method for preparing the modified silicon dioxide nano-particles, the size of the silicon dioxide nano-particles may be selected according to the size of the required modified silicon dioxide nano-particles; preferably, the particle diameter of the silicon dioxide nano-particles is 3-30 nm, including 10-30 nm.

According to the present invention, in the step (1) in the method for preparing the modified silicon dioxide nano-particles, in the presence of a coupler, one or more of the monomers represented by formula (1) and one or more of the monomers represented by formula (2) are subjected to contact with silicon dioxide nano-particles firstly (e.g., by mixing), so that active grafting sites are formed on the silicon dioxide nano-particles under the action of the coupler, and the silicon dioxide nano-particles would able to contact sufficiently with the monomers represented by formula (1) and the monomers represented by formula (2); in addition, in the presence of the monohydric alcohol, the reaction rate of the contact reaction and the reaction rate of the follow-up polymerization reaction can be controlled reasonably, so that modified silicon dioxide nano-particles required in the present invention, which will not agglomerate into large particles and have excellent plugging performance, can be obtained.

There is no particular restriction on the kind of the monohydric alcohol, as long as the above-mentioned effect can be attained; preferably, the monohydric alcohol is one or more of methanol, ethanol, n-propanol and isopropanol, more preferably is one or more of isopropanol, n-propanol and ethanol. There is no particular restriction on the amount of the monohydric alcohol, as long as the reaction rates of the contact reaction and the polymerization reaction can be controlled and optimized to obtain silicon dioxide nano-particles modified by modifying copolymer chains. Preferably, the weight ratio of the silicon dioxide nano-particles to the monohydric alcohol is 1:5-30, including 1:8-25, including 1:10-20, and may be 1:15-20, for example.

There is no particular restriction on the kind of the coupler, as long as the above-mentioned effect can be attained. For example, the coupler may be one or more of silane coupler and the like, preferably is silane coupler, more preferably is one or more of γ-aminopropyl-triethoxysilane (also referred to as KH550), γ-glycidol ether propoxy-trimethoxysilane (also referred to as KH560), γ-(methylacryloyloxy)propyl-trimethoxysilane (also referred to as KH570), and N-(β-aminoethyl)-γ-aminopropyl-trimethoxysilane (also referred to as KH792). There is no particular restriction on the amount of the coupler, as long as the silicon dioxide nano-particles are activated appropriately to obtain an appropriate amount of sites where the modifying copolymer chain can be grafted. Preferably, the weight ratio of the silicon dioxide nano-particles to the coupler is 100: 0.2-10, including 100:0.4-5, including 100:1-4, including 100:1.2-3, and may be 100:1.2-2, for example.

According to the present invention, in the method for preparing the modified silicon dioxide nano-particles, though the step (1) may be implemented by adding the monohydric alcohol, coupler, one or more of the monomers represented by formula (1), and one or more of the monomers represented by formula (2) together into the reaction system, alternatively they may be mixed in separate steps freely and then the obtained mixtures may be mixed together. There is no particular restriction on the specific implementation in the present invention. However, to ensure that more ideal modified silicon dioxide nano-particles can be obtained after the contact reaction and the polymerization reaction, preferably, the step (1) comprises: mixing the monomers represented by formula (1) and the monomers represented by formula (2) firstly (e.g., mixing at 10-40° C. (preferably 20-30° C.) while stirring at a speed of 200-500 rpm (preferably 250-350 rpm) for 10-40 min (preferably 20-30 min)), and adjusting the pH of the obtained mixture to 7-9, preferably 7-8, more preferably 7-7.5 (e.g., one or more of sodium hydroxide, potassium hydroxide, and lithium hydroxide, etc. can be used to make the adjustment); then, subjecting the mixture to have a contact reaction with the silicon dioxide nano-particles, in the presence of a monohydric alcohol and a coupler. To facilitate the operation on the well drilling site, more preferably, the step (1) comprises: preparing a mixture (hereinafter referred to as mixture A) of monomers represented by formula (1) and monomers represented by formula (2); preparing a mixture (hereinafter referred to as mixture B) of the monohydric alcohol and the silicon dioxide nano-particles (e.g., stirring for 10-40 min (preferably 20-30 min) at 200-500 rpm (preferably 250-350 rpm) stirring speed at 10-40° C. (preferably 20-30° C.)); mixing the mixture A with the mixture B to prepare a mixture C (e.g., stirring for 10-40 min (preferably 20-30 min) at 200-500 rpm (preferably 250-350 rpm) stirring speed at 10-40° C. (preferably 20-30° C.)); then, subjecting the mixture C to have the contact reaction in the presence of a coupler.

According to the present invention, in the method for preparing the modified silicon dioxide nano-particles, preferably, in the step (1), the conditions of the contact reaction include: temperature of 10-40° C. (preferably 20-30° C.), and time of 10-60 min (preferably 20-30 min).

According to the present invention, in the step (2) of the method for preparing the modified silicon dioxide nano-particles, under the initiation action of the redox initiator system, the monomers represented by formula (1) and the monomers represented by formula (2) are copolymerized, and grafted on the silicon dioxide nano-particles, so that modified silicon dioxide nano-particles grafted with the modifying copolymer chains are obtained. Generally, the modifying copolymer chains in the present invention may be understood as linear polymer chains, but are not limited to linear polymer chains.

According to the present invention, in the method for preparing the modified silicon dioxide nano-particles, there is no particular restriction on the kind of the redox initiator system, as long as the above-mentioned purpose can be attained; preferably, the reducer in the redox initiator system is sodium bisulfite. Preferably, the oxidizer in the redox initiator system is ammonium persulfate. Wherein, the molar ratio of the reducer to the oxidizer preferably is 1:1-5, more preferably is 1:2.5-3. There is no particular restriction on the amount of the redox initiator system, as long as the modified silicon dioxide nano-particles grafted with the modifying copolymer chains required in the present invention can be obtained; preferably, with respect to 1 mol total amount of the monomers represented by formula (1) and the monomers represented by formula (2), the amount of the redox initiator system is 0.05-1 g, including 0.07-0.8 g, including 0.1-0.4 g, including 0.14-0.3 g, and may be 0.2-0.28 g, for example.

According to the present invention, in the method for preparing the modified silicon dioxide nano-particles, preferably, in the step (2), the conditions of the polymerization reaction include: temperature of 40-80° C. (preferably 50-70° C., e.g., 60° C.), and time of 3-6 h (preferably 4-5 h). The polymerization reaction may be carried out while stirring, for example, at 200-400 rpm stirring speed.

According to the present invention, in the method for preparing the modified silicon dioxide nano-particles, to extract the modified silicon dioxide nano-particles from the polymerization reaction system, the method may further comprise: drying the product of the polymerization reaction (e.g., drying for 5-20 h at 50-80° C., preferably at 60-70° C.) and milling it, to obtain the modified silicon dioxide nano-particles. Here, the product of the polymerization reaction is directly dried and milled, and then the obtained particles may be used as the nano-plugging agent in the drilling fluid. Therefore, the product obtained with the above method is directly used as modified silicon dioxide nano-particles, which include silicon dioxide particles with modifying copolymer chains grafted on the silicon dioxide nano-particles, silicon dioxide nano-particles with modifying copolymer coated on the particles, and other possible particles.

According to the present invention, the mechanism of action of the bionic wall bracing agent is as follows: the byssus threads of a mussel can adhere to the rock surface in the marine environment, and dopamine—a special amino acid derivative contained in byssus protein—is proved to be the key factor for strong subaqueous adhesion of byssus threads. When a mussel secretes byssus protein from its body onto a seabed rock surface, the dopamine groups in the byssus protein will have a cross-linking cure reaction with $Fe^{3+}$ ions in seawater, and thereby cohesive byssus threads with strong adhesion are formed, so that the mussel adheres to the rock surface. A bionic well wall strengthener developed by simulating the structure of adhesive proteins produced by a mussel can contact with and is absorbed to the surface of clay shale along with the drilling fluid in the borehole drilling process, and is cross-linked and cured under the complexing action between the dopamine groups and the $Fe^{3+}$ ions on the surface of clay shale to form a layer of polymer film in 100 μm-1 mm thickness (the thickness increases as the polymer concentration in the drilling fluid increases), which has strong adhesion. The polymer film not only can effectively prevent the drilling fluid from infiltrating into the formation, but also has enough strength to partially balance off the hydration stress borne on the rock, and thereby attains an effect of plugging the pores in the clay shale of borehole wall and improving the strength of the clay shale.

According to a preferred embodiment of the present invention, the bionic wall bracing agent contains structural units represented by formula (I):

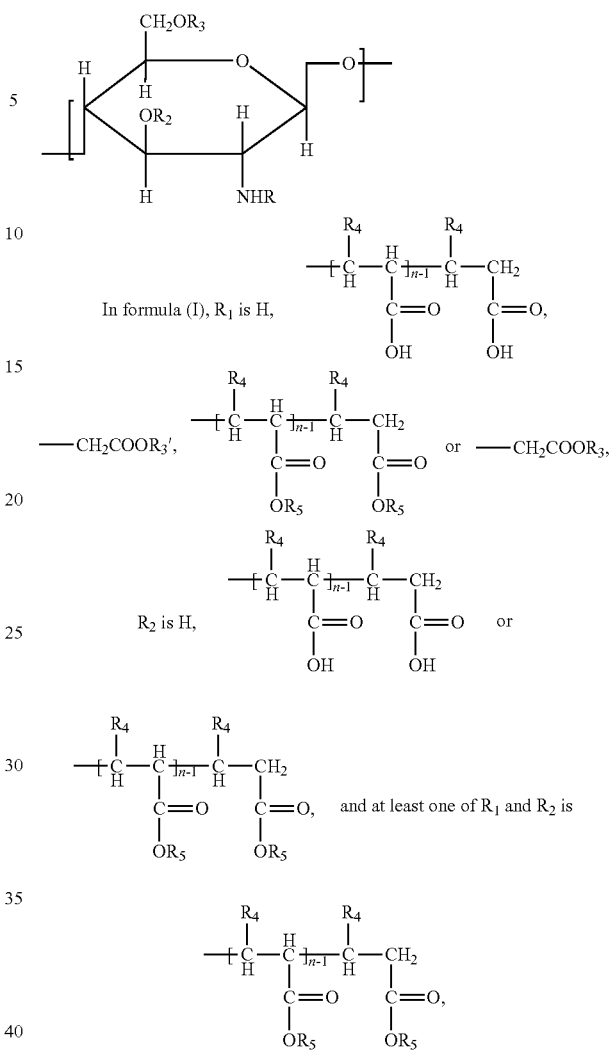

n is an integer equal to or greater than 1, each of the n $R_5$ groups is H or a dopamine-derived group respectively and independently, and at least one of the n $R_5$ groups is the dopamine-derived group, $R_4$ is H or $C_1$-$C_{10}$ alkyl, R''' is H, —$CH_2COOR_3$' or —$CH_2COOR_3$, and $R_1$ and R''' are not H at the same time, $R_3$' is H or alkali metal, and $R_3$ is the dopamine-derived group.

The weight-average molecular weight of the bionic wall bracing agent may be 20,000 g/mol-150,000 g/mol, preferably is 50,000 g/mol-100,000 g/mol.

In certain embodiments, formula (I), $R_4$ is C2-C20 alkyl, including C2-C6 alkyl. Examples of $R_4$ include, but are not limited to: ethyl, propyl, iso-propyl, and butyl.

In certain embodiments, the bionic wall strengthener is prepared with a method comprising the following steps:

(1) initiating a graft copolymerization reaction between a polymer that contains the structural units represented by formula (III) and an unsaturated carboxylic acid represented by general formula $R_4CH=CHCOOH$;

(2) reacting the polymer obtained in step (1) with at least one of dopamine and dopamine hydrochloride;

formula (III)

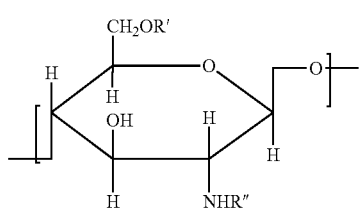

Wherein R' and R" are H or —CH$_2$COOR$_3$' respectively and independently, and R' and R" are not H at the same time; R3' is H or an alkali metal element; R$_4$ is H or C$_1$-C$_{10}$ alkyl.

In the preparation process of the bionic wall bracing agent, in step (1), the conditions of the graft copolymerization reaction may include: temperature of 50-90° C., preferably 60-80° C.; time of 1-1 h, preferably 2-6 h; the molar ratio of the polymer that contains the structural units represented by formula (III) (calculated by hydroxyl groups) to the unsaturated carboxylic acid may be 1:0.1-4, preferably is 1:0.5-3; the graft copolymerization reaction may proceed in the presence of an initiator, which may be one or more of ammonium ceric nitrate, potassium persulfate, and ammonium persulfate.

In certain embodiments, the polymer that contains the structural units represented by formula (III) is carboxymethyl chitosan. In certain embodiments, the carboxymethyl chitosan is mixed, contacts with, and has a graft copolymerization reaction with the unsaturated carboxylic acid in the form of water solution. The water solution of carboxymethyl chitosan may be obtained by dissolving carboxymethyl chitosan (with 10,000 g/mol-80,000 g/mol weight-average molecular weight) in water while stirring (the stirring speed may be 100-500 rpm). The amount of water can be determined appropriately, as long as the carboxymethyl chitosan can be dissolved completely; preferably, the weight ratio of carboxymethyl chitosan to water is 1:20-50.

The unsaturated carboxylic acid may be an unsaturated monocarboxylic acid with carbon number equal to or greater than 3; the carbon number in the unsaturated carboxylic acid preferably is 3-11, more preferably is 3-7. The examples of the unsaturated carboxylic acid include, but are not limited to acrylic acid and/or methacrylic acid.

In the preparation process of the bionic wall bracing agent, in step (2), the conditions of the condensation reaction may include: temperature of 10-50° C., preferably 20-40° C.; time of 2-48 h, preferably 6-36 h. The mole ratio of the amount of the polymer prepared in step (1) (calculated by carboxyl groups) to the total amount of the dopamine and dopamine hydrochloride (calculated by amine groups) may be 1:0.01-0.2, preferably is 1:0.02-0.1. The condensation reaction may proceed in the presence of a catalyst, which may be 1-ethyl-3-(3-dimethyllaminopropyl) carbonyl diimine hydrochlide or N,N'-diisopropyl carbodiimide.

According to the present invention, the bionic shale inhibitor has nanometer-level pores that have high positive charge density and are easy to enter into mud shale and absorb to the surface of clay minerals, and thereby can greatly compress the surface electric double layer of clay, decrease the swelling pressure of clay, and prevent well wall instability resulted from clay swelling. Furthermore, the bionic shale inhibitor produced from amino acids in organisms can be biodegraded in a short period after it is disposed with the waste drilling fluid by landfill disposal subsequently. Hence the bionic shale inhibitor has favorable environmental friendliness. Thus, it can work well with the nano-plugging agent, bionic wall bracing agent, emulsifier, and amphiphobic wettability reversal agent in the drilling fluid, and, when applied in a water-based drilling fluid, can improve the temperature-resistance, plugging, and inhibition performance of the obtained drilling fluid, and work with the filler to obtain a high-density drilling fluid and maintain high environmental protection performance.

In certain embodiments, the weight-average molecular weight of the bionic shale inhibitor is 800-4,000 g/mol, preferably is 1,550-4,000 g/mol, more preferably is 1,600-3,300 g/mol. By confining the weight-average molecular weight of the bionic shale inhibitor disclosed in the present invention within the above-mentioned range, the bionic shale inhibitor can effectively diffuse into pores in mean pore size within 4-10 nm range in shale strata at 2,000 m or greater burial depth, and the bionic shale inhibitor has high adsorptive capacity and adsorptive strength on the surface of clay shale. In contrast, if the weight-average molecular weight of the bionic shale inhibitor is higher than 4,000 g/mol, it will be difficult for the bionic shale inhibitor to diffuse into the pores in mean pore size within 4-10 nm range in shale strata at 2,000 m or greater burial depth. If the weight-average molecular weight of the bionic shale inhibitor is lower than 800 g/mol, the bionic shale inhibitor will not have enough adsorptive strength on the surface of clay shale. The molecular weight distribution index Mw/Mn of the bionic shale inhibitor may be 1.5-3, for example.

According to the present invention, the structural units represented by formula (2)

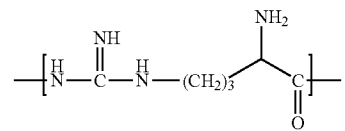

have a main chemical structure of arginine, and the structural units represented by formula (3)

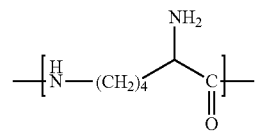

have a main chemical structure of lysine. Hence, actually, the bionic shale inhibitor disclosed in the present subject matter is a type of binary polyamino acid (i.e., condensed peptide of arginine and lysine). In the present subject matter, the structural units represented by formula (2) and the structural units represented by formula (3) are selected to constitute the bionic shale inhibitor disclosed in the present subject matter, because: on one hand, the structural units represented by formula (2) and the structural units represented by formula (3) are in amino acid structure and easy to be degraded by microbes; therefore, they can be defined as a "bionic shale inhibitor"; on the other hand, the structural unit represented by formula (2) has three loci (e.g.,

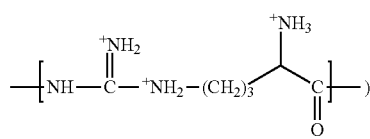

where cationic nitrogen can be formed, and the structural unit represented by formula (3) has one locus (e.g.,

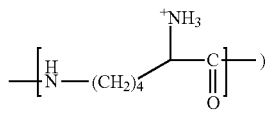

where cationic nitrogen can be formed; hence, by combining the structural units represented by formula (2) with the structural units represented by formula (3), a bionic shale inhibitor that has an appropriate quantity of cations and superior shale inhibition capability can be formed. There is no particular restriction on the terminal groups of the bionic shale inhibitor composed of the structural units represented by formula (2) and the structural units represented by formula (3) in the present subject matter. In other words, the terminal groups can be ordinary groups, such as H, hydroxyl, or salts, etc.

According to the present invention, though it is only required that the bionic shale inhibitor should have a weight-average molecular weight within 800-4,000 g/mol range and should be composed of the structural units represented by formula (3) and the structural units represented by formula (4), in certain embodiments, the mole ratio of the structural units represented by formula (3) to the structural units represented by formula (4) is 0.3-5:1, including 1-5:1, including 1-4:1, optimally is 2-4:1, in order to ensure that the bionic shale inhibitor has better shale inhibition capability and can be more easily degraded by microbes subsequently. In a bionic shale inhibitor composed of the structural units represented by formula (3) and the structural units represented by formula (4) at the preferred mole ratio, the structural units represented by formula (3) and the structural units represented by formula (4) can work more synergistically to improve the shale inhibition capability and biodegradability of the bionic shale inhibitor, and the cost of the bionic shale inhibitor is lower.

There is no particular restriction on the structure of the binary polyamino acid. In other words, the binary polyamino acid can be a regular block copolymer, partially regular block copolymer, or random copolymer. To avoid introducing complexities into the production process, the bionic shale inhibitor disclosed in the present subject matter preferably is a random copolymer.

In certain embodiments, the method for preparing the bionic shale inhibitor comprises: initiating a condensation reaction between arginine and lysine in the presence of an inorganic acid catalyst, wherein, the molar ratio of the concentration of the arginine to the concentration of the lysine is 0.2-6:1, and the conditions of the condensation reaction ensure that the weight-average molecular weight of the resultant bionic shale inhibitor is 800-4,000 g/mol.

According to the present invention, in the method for preparing the bionic shale inhibitor, the arginine may be of L-type, D-type, or a mixture of the two types; the lysine may be of L-type, D-type, or a mixture of the two types. Preferably L-arginine and L-lysine are used.

According to the present invention, in the method for preparing the bionic shale inhibitor, there is no particular restriction on the amounts of the arginine and the lysine, as long as the product of the condensation reaction has 800-4,000 g/mol weight-average molecular weight. Preferably, the mole ratio of the arginine to the lysine is 0.3-0.5:1, including 1-5:1, including 1-4:1, including 2-4:1.

In certain embodiments, in the method for preparing the bionic shale inhibitor, the condensation reaction is performed in the presence of an inorganic acid catalyst. In the present invention, utilizing an inorganic acid catalyst rather than an alkaline compound has two purposes: one purpose is to promote the condensation reaction between the arginine and the lysine, so as to obtain the bionic shale inhibitor disclosed in the present invention at a higher yield ratio, while avoiding excessively high molecular weight of the polymer obtained through the condensation reaction; the other purpose is to enable the resultant polymer to bear cationic nitrogen at a higher level, so as to provide cations to the bionic shale inhibitor. Specifically, the inorganic acid catalyst may be at least one of sulfuric acid, nitric acid, phosphoric acid and hydrochloric acid at 1-6 mol/L concentration, preferably is phosphoric acid (e.g., 85-98 wt. % concentrated phosphoric acid). When phosphoric acid is used as the inorganic acid catalyst, the bionic shale inhibitor disclosed in the present invention can be obtained at a higher yield ratio.

According to the present invention, in the method for preparing the bionic shale inhibitor, preferably, the mole ratio of the amount of the inorganic acid catalyst to the total amount of arginine and lysine is 1:0.3-3, including 1:0.4-3.

In certain embodiments, in the method for preparing the bionic shale inhibitor, preferably, the inorganic acid catalyst is phosphoric acid, and the mole ratio of the amount of the phosphoric acid to the total amount of the arginine and lysine is 1:2-3. Thus, a bionic shale inhibitor with more appropriate weight-average molecular weight can be obtained.

In certain embodiments, in the method for preparing the bionic shale inhibitor, there is no particular restriction on the conditions of the condensation reaction in the present invention, as long as the bionic shale inhibitor with 800-4,000 g/mol weight-average molecular weight can be prepared from the arginine and the lysine at the specified mole ratio. In other words, ordinary conditions for synthesis of an amino acid polymer in the art can be used, for example, a condensation reaction between arginine and lysine in melted state. In certain embodiments, the conditions of the condensation reaction include: temperature of 180-230° C. and time of 4-20 h. More preferably, the conditions of the condensation reaction include: temperature of 195-215° C. and time of 8-16 h.

In certain embodiments, in the method for preparing the bionic shale inhibitor, the method for preparing the bionic shale inhibitor provided in the present invention may further comprise: adjusting the pH of the mixture obtained through the condensation reaction to 6-7, after the condensation reaction is finished. In such a case, the ph may be adjusted with any alkaline compound, such as at least one of alkali metal hydroxides (e.g., sodium hydroxide, potassium hydroxide, and lithium hydroxide), alkali oxides (e.g., sodium oxide, potassium oxide, lithium oxide), alkali carbonates (e.g., sodium carbonate, potassium carbonate, and lithium carbonate), and alkali bicarbonates (e.g., sodium bicarbonate and potassium bicarbonate), etc. The alkaline compound may be used in the form of solution or in the form of solid (e.g., powder or grain form, such as sodium hydroxide powder). In certain embodiments, the alkaline compound is used in the form solution; in certain embodiments, the concentration of the alkaline compound solution is 1-10 mol/L. In certain embodiments, the alkaline compound solution is 3-5 mol/L sodium hydroxide solution, 3-5 mol/L potassium hydroxide solution, or saturated sodium carbonate solution. According to the present invention, to obtain the polymer through the condensation reaction, the method may further comprise: concentrating, drying, and grinding the solution after pH adjustment.

In certain embodiments, in the method for preparing the bionic shale inhibitor, the method further comprises: adding water for dissolution when the temperature drops to 125° C. or a lower value after the reaction is completed; separating the obtained water solution and drying the obtained solid, and then dissolving the obtained solid in dimethyl sulfoxide; finally, evaporating the obtained liquid to obtain the bionic shale inhibitor disclosed in the present invention.

The emulsifier is one or more of compounds represented by the following formula (i):

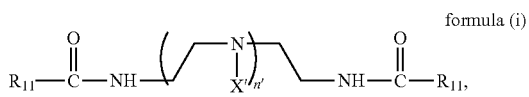

in formula (i), each of the two $R_{11}$ groups is independently selected from C14-C30 alkyl optionally substituted by group Y and C14-C30 unsaturated alkyl with carbon-carbon double bonds optionally substituted by group Y, and the group Y is independently selected from the groups represented by the following formulae:

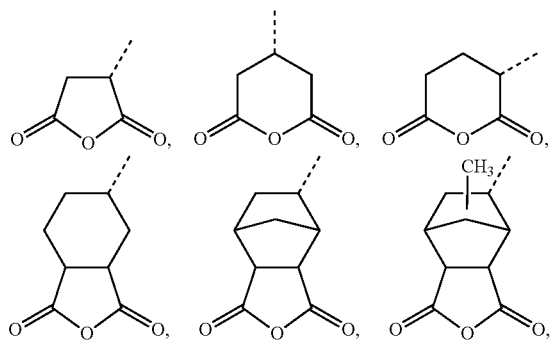

n' is an integer within a range of 1-8;
n' X'-es are independently selected from H and —C(O)—$R_{21}$, and at least one X' is —C(O)—$R_{21}$, $R_{21}$ is selected from carboxyl, C1-C6 alkyl, C3-C8 cycloalkyl, C1-C6 alkyl substituted by carboxyl, C3-C8 cycloalkyl substituted by carboxyl, C3-C8 cycloalkyl substituted by carboxyl and C1-C4 alkyl, C2-C6 unsaturated alkyl with a carbon-carbon double bond, C3-C8 unsaturated cycloalkyl with a carbon-carbon double bond, C2-C6 unsaturated alkyl with a carbon-carbon double bond substituted by carboxyl, and C3-C8 unsaturated cycloalkyl with a carbon-carbon double bond substituted by carboxyl and C1-C4 alkyl.

In certain embodiments, the emulsifier is one or more of compounds represented by formula (i). The compound represented by formula represented by formula (i) is a compound in a comb structure, with saturated and/or unsaturated long alkyl chains at the two ends and a short alkyl chain in the middle. Such a compound in a comb structure can increase the strength of the emulsion interface film, work with the nano-plugging agent, bionic wall bracing agent, bionic shale inhibitor, filler and amphiphobic wettability reversal agent obtained in the present invention to stabilize the drilling fluid and enables the drilling fluid to have appropriate shearing force and density and thereby has suspending power, and attain the purpose of improving the temperature resistance property of the drilling fluid in such a case.

In certain embodiments, in Formula (i), each of the two $R_{11}$ groups is independently selected from C14-C20 alkyl optionally substituted by group Y and C14-C20 unsaturated alkyl with a carbon-carbon double bond optionally substituted by group Y (preferably with not more than 5 carbon-carbon double bonds, 1, 2 or 3 for example); n is an integer of 1-6; $R_{21}$ is selected from carboxyl, C1-C4 alkyl, C4-C6 cycloalkyl, C1-C4 alkyl substituted by carboxyl, C4-C6 cycloalkyl substituted by carboxyl, C4-C6 cycloalkyl substituted by carboxyl and methyl, C2-C4 unsaturated alkyl with a carbon-carbon double bond (preferably with 1-3 carbon-carbon double bonds, 1, 2 or 3 for example), C4-C6 unsaturated cycloalkyl with a carbon-carbon double bond (preferably with not more than 5 carbon-carbon double bonds, 1, 2 or 3 for example), C2-C4 unsaturated alkyl with a carbon-carbon double bond substituted by carboxyl (preferably with 1-3 carbon-carbon double bonds, 1, 2 or 3 for example), and C4-C7 unsaturated cycloalkyl with a carbon-carbon double bond substituted by carboxyl and methyl (preferably with not more than 5 carbon-carbon double bonds, 1, 2 or 3 for example).

In certain embodiments, in Formula (i), each of the two $R_{11}$ groups is independently selected from C15-C18 alkyl optionally substituted by group Y and C15-C18 unsaturated alkyl with a carbon-carbon double bond optionally substituted by group Y; n' is an integer of 1-4, for example 1, 2, 3 or 4.

In certain embodiments, the two $R_{11}$ groups are selected independently and may be same or different. The embodiments of $R_{11}$ for example may include the following groups:
—$(CH_2)_7$—CH=CH—$(CH_2)_7$—$CH_3$, —$(CH_2)_8$—CH(Y)—$(CH_2)_7$—$CH_3$, —$(CH_2)_7$—CH(Y)—$(CH_2)_8$—$CH_3$, —$(CH_2)_7$—CH(Y)—CH(Y)—$(CH_2)_7$—$CH_3$, —$(CH_2)_{16}$—$CH_3$, —$(CH_2)_7$—CH=CH—$CH_2$—CH=CH—$(CH_2)_4$—$CH_3$, —$(CH_2)_7$—CH=CH—$CH_2$—$CH_2$—CH(Y)—$(CH_2)_4$—$CH_3$, —$(CH_2)_7$—CH=CH—$CH_2$—CH(Y)—$(CH_2)_5$—$CH_3$, —$(CH_2)_8$—CH(Y)—$CH_2$—CH=CH—$(CH_2)_4$—$CH_3$, —$(CH_2)_7$—CH(Y)—$CH_2$—$CH_2$—CH=CH—$(CH_2)_4$—$CH_3$, —$(CH_2)_7$—CH=CH—$CH_2$—CH(Y)—CH(Y)—$(CH_2)_4$—$CH_3$, —$(CH_2)_7$—CH(Y)—CH—$(Y)$—$CH_2$—CH=CH—$(CH_2)_4$—$CH_3$, —$(CH_2)_7$—CH(Y)—CH(Y)—$CH_2$—CH(Y)—$(CH_2)_5$—$CH_3$, —$(CH_2)_8$—CH(Y)—$CH_2$—CH(Y)—CH(Y)—$(CH_2)_4$—$CH_3$, —$(CH_2)_7$—CH(Y)—$CH_2$—$CH_2$—CH(Y)—CH(Y)—$(CH_2)_4$—$CH_3$, —$(CH_2)_7$—CH(Y)—CH(Y)—$CH_2$—$CH_2$—CH(Y)—$(CH_2)_4$—$CH_3$, —$(CH_2)_7$—CH(Y)—CH(Y)—$CH_2$—CH(Y)—CH(Y)—$(CH_2)_4$—$CH_3$, —$(CH_2)_{14}$—$CH_3$, —$(CH_2)_{13}$—$CH_3$. where group Y, as described above, is selected from

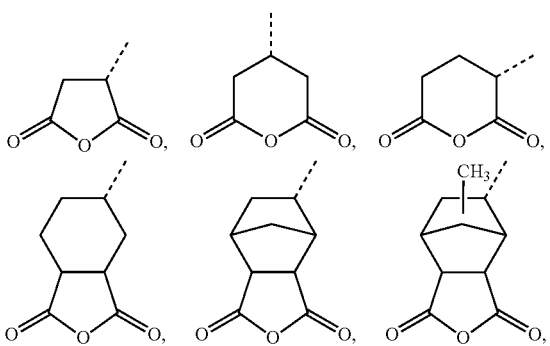

The connecting dotted lines on these groups stand for linkage sites linking the carbon atoms on $R_{11}$.

In certain embodiments, the embodiments of group $R_{21}$ for example may include: carboxyl, methyl, ethyl, propyl, cyclopentyl, cyclohexyl, —$CH_2$—COOH (referring to C1 alkyl substituted by a carboxyl group), —$(CH_2)_2$—COOH (referring to C2 alkyl substituted by a carboxyl group), —$CH(CH_2$—$COOH)_2$ (referring to C3 alkyl substituted by two carboxyl groups),

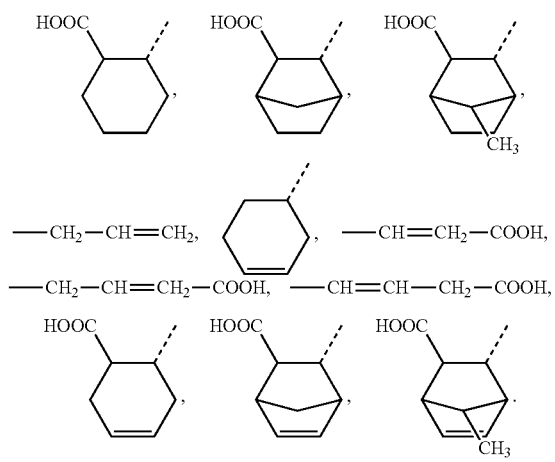

In certain embodiments, the foregoing emulsifier may be a product available in the market and may also be prepared by a conventional method of the art. Preferably, the method for preparing the emulsifier comprises: subjecting a polyamine compound represented by Formula (ii) to undergo an amidation reaction (e.g., to form an amide functional group) with one or more of carboxylic acids represented by Formula $R_{11}'$—COOH, and contacting and reacting the reaction product with one or more of carboxylic acids $R_{21}$—COOH and anhydrides thereof;

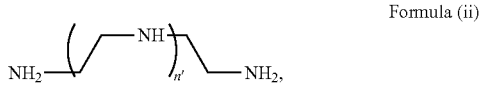

Formula (ii)

where $R_{21}$ and n' have been described above, so no necessary details will be given herein.

$R_{11}'$ is selected from C14-C30 alkyl and C14-C30 unsaturated alkyl with a carbon-carbon double bond.

The embodiments of the carboxylic acids represented by Formula $R_{11}$—COOH for example may include: COOH—$(CH_2)_7$—CH=CH—$(CH_2)_7$—$CH_3$ (also called as oleic acid), COOH—$(CH_2)_7$—CH=CH—$CH_2$—CH=CH—$(CH_2)_4$—$CH_3$ (also called as linoleic acid), COOH—$(CH_2)_{16}$—$CH_3$ (also called as octadecanoic acid), COOH—$(CH_2)_{14}$—$CH_3$ (also called as hexadecanoic acid or palmitic acid), COOH—$(CH_2)_{13}$—$CH_3$ (also called as pentadecanoic acid).

The embodiments of carboxylic acids represented by Formula $R_{21}$—COOH and anhydrides thereof for example may include: HOOC—COOH (oxalate), $CH_3$—COOH (acetic acid), $CH_3$—COO—CO—$CH_3$ (acetic anhydride), HOOC—$CH_2$—COOH (malonic acid), HOOC—$CH_2$—$CH_2$—COOH (succinic acid), HOOC—$CH_2$—CH(COOH)—$CH_2$—COOH (tricarballylic acid),

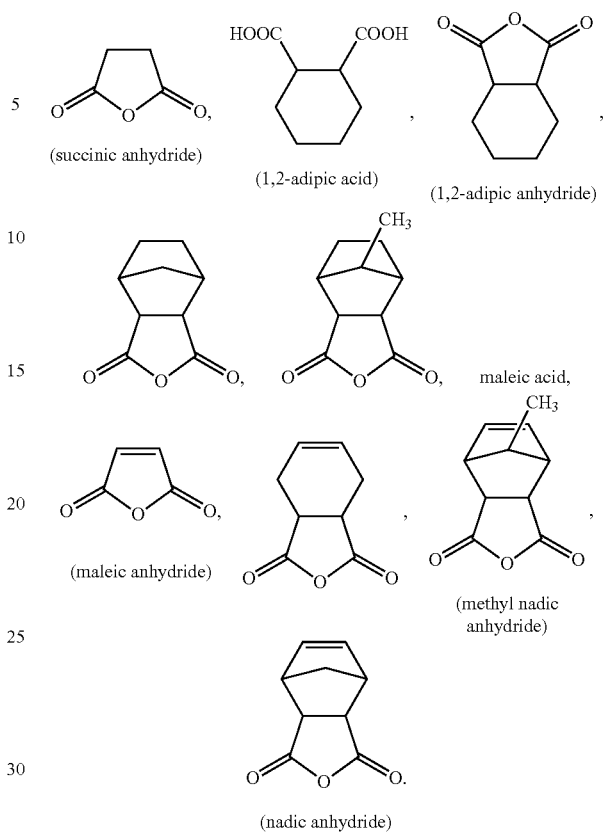

According to the present invention, the embodiments of the polyamine represented by Formula (ii) for example may include:

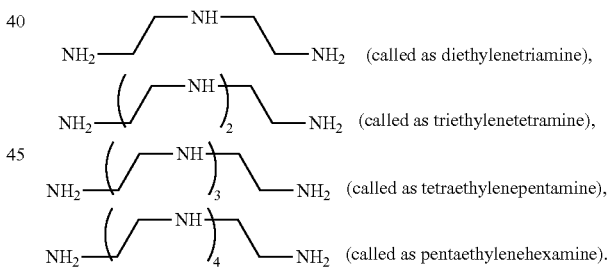

In certain embodiments, the amidation reaction between the polyamine represented by foregoing Formula (ii) and the carboxylic acid represented by $R_{11}$—COOH mainly refers to the amidation reaction between the primary amine of the polyamine represented by foregoing Formula (ii) and the carboxylic group of the carboxylic acid represented by $R_{11}$—COOH, with water molecules removed to form amido bonds, thereby obtaining one or more of compounds with secondary amine not substituted in the middle of the chain as represented by Formula (i')

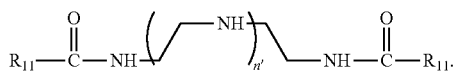

In certain embodiments, the molar ratio of the polyamine compound represented by Formula (ii) and the carboxylic acid represented by Formula $R_{11'}$—COOH is 1:1.8-3, preferably 1:1.8-2.2.

In certain embodiments, the conditions of the amidation reaction comprise: the temperature is a temperature of 220-230° C., pH value of 7-9 and a time of 3-5 h. In order to make amidation reaction more sufficient, this method may further comprise: firstly mixing the polyamine represented by Formula (ii) with one or more of carboxylic acids represented by $R_{11'}$—COOH for 10-30 min under a stirring rate of 80-300 r/min, then taking the amidation reaction under a stirring rate of 80-300 r/min, and water is trapped by water knockout trap during amidation reaction.

In certain embodiments, the emulsifier of the present invention may be obtained through contacting and reacting the above reaction product of the amidation reaction with one or more of the carboxylic acids represented by $R_{21}$—COOH and anhydrides thereof. The reaction product of amidation reaction may be purified to obtain the compound represented by

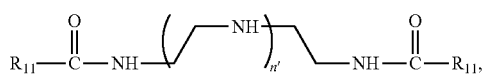

alternatively, the reaction product of amidation reaction without purification may directly contact and react with one or more of the carboxylic acids represented by $R_{21}$—COOH and anhydrides thereof so as to link-C(O)—$R_{21}$ substituent to the secondary amine between two amido bonds, thereby forming the compound with a comb-like structure represented by Formula (i). Preferably, the molar ratio of the polyamine compound represented by Formula (ii) and the carboxylic acids represented by Formula $R_{21}$—COOH and anhydrides thereof is 1:0.5-20. For example, the molar ratio of the polyamine compound represented by Formula (ii) and the carboxylic acids represented by Formula $R^2$—COOH and anhydrides thereof is 1:1.8-2.2, 1:3.6-4.4, 1:5.4-6.6, 1:7.2-8.8, 1:9-11, 1:10.8-13.2.

In certain embodiments, when the carboxylic acid represented by $R_{11'}$—COOH is an unsaturated carboxylic acid with a carbon-carbon double bond, and the carboxylic acids represented by Formula $R_{21}$—COOH and anhydrides thereof adopted in the process of the contract reaction also contain a carbon-carbon double bond, then in the process of the contact reaction, addition reaction may also occur between the carbon-carbon double bond in the carboxylic acids represented by Formula $R^2$—COOH (and anhydrides thereof) and the carbon-carbon double bond in the reaction product of the amidation reaction, thereby obtaining the compound with $R_{11}$ (shown in Formula (i)) substituted by group Y. Although the present invention does not have particular limitation to this, the compound obtained under this case is also included in the emulsifier described in the present invention.

In certain embodiments, the conditions of the contact reaction comprise: a temperature of 75-90° C., pH value of 7-9 and a time of 6-10 h. In order to make contact reaction more sufficient, this method may further comprise: contacting and reacting the reaction product of the amidation reaction with one or more of the carboxylic acids represented by Formula $R_{21}$—COOH and anhydrides thereof under a stirring rater of 200-500 r/min, and water is trapped by water knockout trap during the contact reaction.

In certain embodiments, it should be noted that the emulsifier of the present invention may be one of the compounds represented by Formula (i), but if the foregoing preparation method is adopted, the emulsifier may also be one of the compounds represented by Formula (i) obtained through purifying and separating the product obtained by the foregoing preparation method. However, as more effective operation, the emulsifier of the present invention may be more of the compounds represented by Formula (i), i.e.: if the foregoing preparation method is adopted, the emulsifier may be a product directly obtained by the foregoing preparation method and is uses without purification. In other words, it may be understood that the emulsifier of the present invention is a product obtained by the foregoing method without purification.

In certain embodiments, the dual-cation fluorocarbon surfactant can serve as an amphiphobic wettability reversal agent when it is used in a drilling fluid; thus, when the drilling fluid is used for oil and gas drilling, the molecules of the dual-cation fluorocarbon surfactant can be absorbed to the rock surface easily owing to the fact that the molecules have low surface tension, and thereby the rock obtains an amphiphobic property; as a result, permeation of water and oil into the rock can be avoided effectively and thereby a capillary phenomenon can be prevented, and an effect of stabilizing the well wall and protecting the reservoir is attained.

In the present invention, the C1-C6 alkyl may be methyl, ethyl, n-propyl, isopropyl, n-butyl, isobutyl, sec-butyl, tert-butyl, n-pentyl, isopentyl, n-hexyl, etc., for example.

The C1-C10 alkylene may be the alkylene formed by C1-C6 alkyl described above, or n-heptyl, n-nonyl, or n-decyl, etc.

In certain embodiments, in formula (a), each $R^1$ is selected from C1-C4 alkyl respectively and independently, each $R^2$ is independently selected from H and C1-C4 alkyl, each $R^3$ is independently selected from C2-C8 alkylene, each n" is independently selected from integers within a range of 4-10, and m is selected from integers within a range of 2-8.

In certain embodiments, in formula (a), each $R^1$ is independently selected from C1-C4 alkyl, each $R^2$ is independently selected from H and C1-C4 alkyl, each $R^3$ is independently selected from C2-C6 alkylene, each n" is independently selected from integers within a range of 4-8, and m is selected from integers within a range of 3-6.

In certain embodiments, in formula (a), each $R^1$ is independently selected from methyl, ethyl, n-propyl, isopropyl, and n-butyl, each $R^2$ is independently selected from H, methyl, ethyl, n-propyl, isopropyl, and n-butyl, each $R^3$ is independently selected from —$CH_2$—$CH_2$—, —$CH_2$—$CH_2$—$CH_2$—, —$CH(CH_3)$—$CH_2$—, —$CH_2$—$CH(CH_3)$—, —$CH_2$—$(CH_2)_2$—$CH_2$—, —$CH_2$—$(CH_2)_3$—$CH_2$—, and —$CH_2$—$(CH_2)_4$—$CH_2$—, each n" is independently selected from 4, 5, 6, 7 and 8, and m is selected from 3, 4, 5 or 6.

In certain embodiments, the cation part shown in formula (a) is one of the following cations:

Formula (a-1): in formula (a), all the $R^1$ is methyl, both $R^2$ is H, both $R^3$ is —$CH_2$—$CH_2$—$CH_2$—, both n" is 4, and m is 4;

Formula (a-2): in formula (a), all the $R^1$ is methyl, both $R^2$ is H, both $R^3$ is —$CH_2$—$CH_2$—$CH_2$—, both n" is 6, and m is 4;

Formula (a-3): in formula (a), all the $R^1$ is methyl, both $R^2$ is H, both $R^3$ is —$CH_2$—$CH_2$—$CH_2$—, both n" is 8, and m is 4;

Formula (a-4): in formula (a), all the $R^1$ is methyl, both $R^2$ is H, both $R^3$ is —$CH_2$—$CH_2$—$CH_2$—, both n" is 4, and m is 6.

There is no particular restriction on the anion part of the dual-cation fluorocarbon surfactant in the present invention; namely, the anion may be any conventional anion in the art; however, preferably, the anion part of the dual-cation fluorocarbon surfactant is selected from one or more of $Cl^-$, $Br^-$, and $I^-$, more preferably is $Cl^-$ or $Br^-$.

The present invention further provides a method for preparing the dual-cation fluorocarbon surfactant, comprising: subjecting the compound represented by formula (b-2) and the compound represented by formula (b-3) to have a substitution reaction in an alcohol solvent, wherein

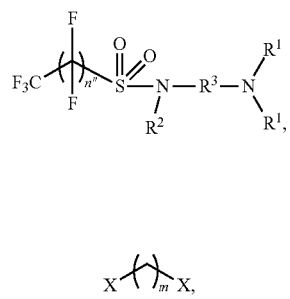

formula (b-2)

formula (b-3)

X is selected from halogen.

In certain embodiments, the compound represented by formula the (b-2) and the compound represented by formula the (b-3) have a substitution reaction, so that two molecules of the compound represented by formula the (b-2) are linked to the two ends of a molecule of the compound represented by formula (b-3), forming a dual-cation fluorocarbon structure with two quaternary ammonium cations represented by formula (a).

Wherein, the compound represented by formula (b-2) and the compound represented by formula (b-3) may be selected according to the dual-cation fluorocarbon surfactant. They will not be detailed any more here.

In certain embodiments, the compound represented by formula (b-2) is selected from one or more of compounds represented by the following formulae:
In formula (b-2-1): in formula (b-2), both $R^1$ is methyl, $R^2$ is H, $R^3$ is —$CH_2$—$CH_2$—$CH_2$—, and n" is 4;
In formula (b-2-2): in formula (b-2), both $R^1$ is methyl, $R^2$ is H, $R^3$ is —$CH_2$—$CH_2$—$CH_2$—, and n" is 6;
In formula (b-2-3): in formula (b-2), both $R^1$ is methyl, $R^2$ is H, $R^3$ is —$CH_2$—$CH_2$—$CH_2$—, and n" is 8.

The compound represented by formula (b-3) is selected from one or more of compound represented by the following formulae:
In formula (b-3-1): in formula (b-3), X is Br, and m is 4;
In formula (b-3-2): in formula (b-3), X is Br, and m is 6.

In certain embodiments, the compound represented by formula (b-2) may be a commercially available product or prepared with a conventional method in the art. For example, the method for preparing the compound represented by formula (b-2) may comprise: subjecting a compound represented by formula (b-4) and a perfluoroalkyl sulfuryl fluoride compound represented by formula (b-5) to have a contact reaction in the presence of a basic catalyst in an organic solvent, wherein

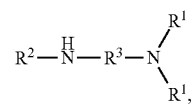

formula (b-4)

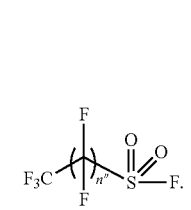

formula (b-5)

The groups involved in the formulae are those as defined above, and will not be further detailed here.

In certain embodiments, the compound represented by formula (b-4) is selected from one or more of compounds represented by the following formulae:
In formula (b-4-1): in formula (b-4), both $R^1$ is methyl, $R^2$ is H, and $R^3$ is —$CH_2$—$CH_2$—$CH_2$— (also referred to as N,N-dimethyl-1,3-propylene diamine).

The perfluoroalkyl sulfuryl fluoride compound represented by formula (b-5) is selected from one or more of compounds represented by the following formulae:
In formula (b-5-1): in formula (b-5), n" is 4 (also referred to as perfluorobutyl sulfuryl fluoride);
In formula (b-5-2): in formula (b-5), n" is 6 (also referred to as perfluorohexyl sulfuryl fluoride);
In formula (b-5-3): in formula (b-5), n" is 8 (also referred to as perfluorooctyl sulfuryl fluoride).

Wherein, the molar ratio of the compound represented by formula (b-4) to the perfluoroalkyl sulfuryl fluoride compound represented by formula (b-5) may be 1:0.8-3, for example. In certain embodiments, the basic catalyst is one or more of triethylamine and/or triethanolamine. The molar ratio of the basic catalyst to the compound represented by formula (b-4) may be 1-3:1, for example. The organic solvent may be one or more of dichloromethane, dichloroethane, THF and DMF. With respect to 0.1 mol compound represented by formula (b-4), the amount of the organic solvent preferably is 150-300 mL. In certain embodiments, the conditions of the contact reaction include: reacting at 0-10° C. for 30-100 min firstly, and then reacting at 15-40° C. for 3-6 h. To make the reaction proceed more fully, preferably, the compound represented by formula (b-4), the basic catalyst, and the organic solvent are mixed first, and then the perfluoroalkyl sulfuryl fluoride compound represented by formula (b-5) is introduced. Especially, the perfluoroalkyl sulfuryl fluoride compound represented by formula (b-5) is introduced by dropwise adding.

In certain embodiments, in the method for preparing the dual-cation fluorocarbon surfactant, preferably, the molar ratio of the compound represented by formula (b-2) to the compound represented by formula (b-3) is 1:1-3, including 1:1-2.

In certain embodiments, the alcohol solvent may be any solvent that can dissolve the compound represented by formula (b-2) and can be used for the substitution reaction between the compound represented by formula (b-2) and the compound represented by formula (b-3), preferably is one or more of methanol, ethanol, n-propanol, isopropanol, and n-butanol. The amount of the alcohol solvent may vary within a wide range, as long as the above-mentioned substitution reaction can proceed successfully; however, to make the reaction proceed more fully and avoid wasting the solvent, preferably, with respect to 10 mmol compound represented by formula (b-2), the amount of the alcohol solvent is 30-100 mL (e.g., 30-60 mL).

In certain embodiments, the conditions of the substitution reaction include: temperature of 60-100° C. (preferably 70-85° C.) and time of 4-10 h (preferably 5-8 h). To make the reaction proceed more fully, the alcohol solvent and the compound represented by formula (b-2) may be mixed first to dissolve the compound represented by formula (b-2) in the alcohol solvent, and then the compound represented by formula (b-3) may be introduced to have substitution reaction. Especially, the compound represented by formula (b-3) is introduced into the reaction system by dropwise adding.

In certain embodiments, to extract the dual-cation fluorocarbon surfactant, the method may further comprise: cooling the product of the substitution reaction to room temperature (about 10-40° C.), and then carrying out solid-liquid separation, washing the solid phase, and drying the obtained solid, so as to obtain the dual-cation fluorocarbon surfactant.

In certain embodiments, the water-based drilling fluid (hereinafter also referred to as a high-density drilling fluid) that contains the additives described above in the present invention has high temperature-resistance, plugging, and inhibition performance, and can obtain high density, and thereby is especially suitable for mining shale gas in complex formations. Preferably, with respect to 100 pbw (part by weight) water in the drilling fluid, the total content of the nano-plugging agent, bionic wall bracing agent, bionic shale inhibitor, emulsifier, and amphiphobic wettability reversal agent is 20 pbw or lower, preferably is 10 pbw or lower, more preferably is 8 pbw or lower, further more preferably is 6 pbw or lower. On that basis, with respect to 100 pbw water in the drilling fluid, preferably, the content of the nano-plugging agent is 5 pbw or lower (preferably 3 pbw or lower, more preferably 2 pbw or lower, e.g., 1-2 pbw), the content of the bionic wall bracing agent is 5 pbw or lower (preferably 3 pbw or lower, more preferably 2 pbw or lower, further more preferably 0.5-2 pbw, e.g., 0.5-1 pbw), the content of the bionic shale inhibitor is 5 pbw or lower (preferably 3 pbw or lower, more preferably 2 pbw or lower, further more preferably 0.5-2 pbw, e.g., 0.5-1 pbw), the content of the emulsifier is 1-5 pbw, and the content of the amphiphobic wettability reversal agent is 0.1-0.5 pbw.

In certain embodiments, the water-based drilling fluid may further contain conventional additives commonly used in water-based drilling fluids. To obtain appropriate density, the drilling fluid further contains a filler, which consists of calcium carbonate of 1,600-2,500 mesh, calcium carbonate of 1,050-1,500 mesh, and calcium carbonate of 500-1,000 mesh at a weight ratio of 1:0.55-6:0.55-6. In certain embodiments, the filler consists of calcium carbonate of 1,900-2,200 mesh, calcium carbonate of 1,000-1,240 mesh, and calcium carbonate of 720-920 mesh at a weight ratio of 1:1-2:1-2. With respect to 100 pbw water in the drilling fluid, in certain embodiments, the content of the filler is 1-5 pbw, more preferably is 2-4 pbw.

In certain embodiments, the water-based drilling fluid may contain other conventional additives commonly used in water-based drilling fluids; preferably, the drilling fluid further contains one or more of tackifier, filtrate reducer, anti-collapse agent, lubricant, and weighting agent, etc.

Wherein, the tackifier can improve the viscous shearing force of the drilling fluid. For example, the viscosity improver may be one or more of potassium polyacrylamide (KPAM), polyanionic cellulose (e.g., PAC141), and copolymer of acrylamide and sodium acrylate (e.g., 80A51), preferably is potassium polyacrylamide. With respect to 100 pbw water in the drilling fluid, preferably the content of the tackifier is 0.1-0.5 pbw, more preferably is 0.1-0.2 pbw.

Wherein, the filtrate reducer has certain anti-collapse, plugging, and filtrate loss reduction effects. For example, the filtrate reducer may be one or more of modified starch and sulfonated bitumen, etc., and preferably is modified starch. With respect to 100 pbw water in the drilling fluid, preferably the content of the filtrate reducer is 1-5 pbw, more preferably is 2-4 pbw.

Wherein, the anti-collapse agent can assist the bionic shale inhibitor to prevent collapse of the well wall and improve the stability of the well wall. For example, the anti-collapse agent may be one or more of potassium humate (KHM), silicone (e.g., GF-1), and sulfonated bitumen (e.g., FT-1A), preferably is potassium humate. With respect to 100 pbw water in the drilling fluid, preferably the content of the anti-collapse agent is 1-5 pbw, including 2-4 pbw.

Wherein, the lubricant can improve the lubricating property of the drilling fluid and prevent complex downhole accidents such as jamming of a drilling tool. For example, the lubricant may be one or more of sulfonated oil sediment (e.g., FK-10), mixture of diesel oil and surface active agent (e.g., FRH), and mixture of fatty glyceride and surface active agent (e.g., FK-1), preferably is FK-10. With respect to 100 pbw water in the drilling fluid, preferably the content of the lubricant is 1-5 pbw, including 2-4 pbw.

Wherein, the purpose of the weighting agent is to adjust the density of the drilling fluid to required density. For example, the weighting agent may be one or more of barite (e.g., barite with 90 wt. % or more barium sulfate) and organic salt (weigh-1, weigh-2 (the active ingredient is potassium formate), weigh-3, organic sodium salt GD-WT), etc. With respect to 100 pbw water in the drilling fluid, preferably the content of the weighting agent is 200-400 pbw, including 330-350 pbw.

The above additives may be commercially available products, or may be prepared with conventional methods in the art. They will not be further detailed hereunder.

In certain embodiments, the water-based drilling fluid can obtain high temperature-resistance, plugging, and inhibition performance, and can obtain high density, wherein a density of 1.9 g/cm$^3$ or above can be denoted as a high density in present invention. For example, the drilling fluid can withstand 120° C. or higher temperature, and has 2.3 g/cm$^3$ or higher density (the density remains unchanged essentially after hot aging).

Hereunder the present invention will be detailed in embodiments.

In the following embodiments and reference examples: The weight-average molecular weight and molecular weight distribution index are measured with a gel permeation chrommatograph (GPC) (GPC E2695 from Waters Corporation (a US company)). The particle size distribution of the modified silicon dioxide nano-particles dispersed in the drilling fluid is measured with a Zeta potential and laser particle size analyzer (from Malvern Instruments Ltd. (a UK company)). The SEM images are obtained with a F20 Field Emission SEM from Hitachi. The content of the copolymer chains refers to the weight percentage of the copolymer in the obtained product. The filler consists of calcium carbonate of 2,000 mesh, calcium carbonate of 1,200 mesh, and calcium carbonate of 800 mesh at a weight ratio of 1:1:1.

Nano-Plugging Agent Preparation Example 1

(1) 0.12 mol p-styrenesulfonic acid and 0.19 mol N,N'-methylene-bis acrylamide (purchased from Hengtai Taili Chemical Co., Ltd.) are mixed and stirred at about 25° C. for 30 min with 300 rpm stirring speed, and the pH of the mixture is adjusted to 7 with sodium hydroxide; thus, a mixture A1 is obtained; 0.5 g silicon dioxide nano-particles (purchased from Nanjing Tianxing New Materials Co., Ltd with a trade mark TSP, in about 20 nm particle diameter) and 8 g n-propanol are mixed and stirred at about 25° C. for 30 min with 300 rpm stirring speed, to obtain a mixture B1; the mixture A1 and the mixture B1 are mixed and stirred at about 25° C. for 30 min with 300 rpm stirring speed, to obtain a mixture C1;

(2) 0.01 g coupler γ-aminopropyl-triethoxysilane (purchased from Hengtai Taili Chemical Co., Ltd. with a trade mark KH550) and the mixture C1 are mixed and react at 60° C. for 30 min while stirring at 200 rpm stirring speed; then, 0.094 g redox initiator system (consisting of sodium bisulfite and ammonium persulfate at 1:2.5 molar ratio) is added, and then the mixture takes a polymerization reaction at 60° C. for 4 h while stirring at 200 rpm stirring speed;

(3) The product of the polymerization reaction is dried at 70° C. over night (about 24 h), and then is milled; thus, modified silicon dioxide nano-particles S1 are obtained.

Analyzed by infrared, $^1$H-NMR and $^{13}$C-NMR spectroscopy, the modified silicon dioxide nano-particles S1 bear random copolymer chains composed of structural units represented by formula (1-a) ($R^8$ is —$SO_3H$, $R^6$-$R^7$ and $R^9$-$R^{10}$ are H, and L' is C0 alkylene) and structural units represented by formula (2-a) (L is —$CH_2$—) at 1:1.5 molar ratio, the content of the copolymer chain is 92 wt. %, and the weight-average molecular weight of the copolymer chain is about 860,000 g/mol; the particle diameter of the modified silicon dioxide nano-particles S1 is about 26 nm. An SEM image of the modified silicon dioxide nano-particles S1 is shown in FIG. 1.

Nano-Plugging Agent Preparation Example 2

(1) 0.15 mol p-styrenesulfonic acid and 0.2 mol N,N'-methylene-bis acrylamide (purchased from Hengtai Taili Chemical Co., Ltd.) are mixed and stirred at about 30° C. for 25 min with 250 rpm stirring speed, and the pH of the mixture is adjusted to 7.5 with sodium hydroxide; thus, a mixture A2 is obtained; 1 g silicon dioxide nano-particles (purchased from Nanjing Tianxing New Materials Co., Ltd with a trade mark TSP, in about 20 nm particle diameter) and 8 g isopropanol are mixed and stirred at about 30° C. for 25 min with 250 rpm stirring speed, to obtain a mixture B2; the mixture A2 and the mixture B2 are mixed and stirred at about 30° C. for 25 min with 250 rpm stirring speed, to obtain a mixture C2;

(2) 0.012 g coupler γ-aminopropyl-triethoxysilane (purchased from Hengtai Taili Chemical Co., Ltd. with a trade mark KH550) and the mixture C2 are mixed and react at 50° C. for 30 min while stirring at 250 rpm stirring speed; then, 0.094 g redox initiator system (consisting of sodium bisulfite and ammonium persulfate at 1:3 molar ratio) is added, and then the mixture takes a polymerization reaction at 50° C. for 5 h while stirring at 200 rpm stirring speed;

(3) The product of the polymerization reaction is dried at 70° C. over night (about 24 h), and then is milled; thus, modified silicon dioxide nano-particles S2 are obtained.

Analyzed by infrared, $^1$H-NMR and $^{13}$C-NMR spectroscopy, the modified silicon dioxide nano-particles S2 bear random copolymer chains composed of structural units represented by formula (1-a) ($R^8$ is —$SO_3H$, $R^6$-$R^7$ and $R^9$-$R^{10}$ are H, and L' is C0 alkylene) and structural units represented by formula (2-a) (L is —$CH_2$—) at 1:1.33 molar ratio, the content of the copolymer chain is 94 wt. %, and the weight-average molecular weight of the copolymer chain is about 980,000 g/mol; the particle diameter of the modified silicon dioxide nano-particles S2 is about 23 nm.

Comparative Nano-Plugging Agent Preparation Example 1

The method described in the nano-plugging agent preparation example 1 is used, but N,N'-methylene-bis acrylamide is not added in the step (1), and the amount of p-styrenesulfonic acid is increased to 0.3 mol; thus, modified silicon dioxide nano-particles DS1 are prepared through three steps.

Analyzed by infrared, $^1$H-NMR and $^{13}$C-NMR spectroscopy, the modified silicon dioxide nano-particles DS1 bear polymer chains composed of structural units represented by formula (1-a) ($R^8$ is —$SO_3H$, $R^6$-$R^7$ and $R^9$-$R^{10}$ are H, and L' is C0 alkylene), the content of the polymer chain is 98 wt. %, and the weight-average molecular weight of the polymer chain is about 1,500,000 g/mol; the particle diameter of the modified silicon dioxide nano-particles DS1 is about 50 nm.

Comparative Nano-Plugging Agent Preparation Example 2

The method described in the nano-plugging agent preparation example 1 is used, but p-styrenesulfonic acid is not added in the step (1), and the amount of N,N'-methylene-bis acrylamide is increased to 0.3 mol; thus, modified silicon dioxide nano-particles DS2 are prepared through three steps.

Analyzed by infrared, $^1$H-NMR and $^{13}$C-NMR spectroscopy, the modified silicon dioxide nano-particles DS2 bear polymer chains composed of structural units represented by formula (2-a) (L is —$CH_2$—), the content of the polymer chain is 96 wt. %, and the weight-average molecular weight of the polymer chain is about 120,000 g/mol; the particle diameter of the modified silicon dioxide nano-particles DS2 is about 42 nm.

Bionic Wall Bracing Agent Preparation Example 1

(1) 1,000 kg deionized water is loaded into a container, 50 kg carboxymethyl chitosan (purchased from Beijing datianfengtuo Chemical Technology Co., Ltd., having a structure represented by formula (III), weight-average molecular weight=52,000 g/mol, degree of carboxymethyl substitution=1.4) is added into the container while stirring (at 200 rpm stirring speed), and the mixture is further stirred till the carboxymethyl chitosan is dissolved fully and there is no flocculent solid suspending in the solution).

(2) 50 kg acrylic acid is added into the water solution of carboxymethyl chitosan, the solution is stirred for 5 min, and then 2 kg nitric acid is added and the solution is stirred further for 5 min, till the carboxymethyl chitosan, acrylic acid and nitric acid solution are mixed to a homogeneous state. Then, 4 kg ammonium ceric nitrate is added, and the solution is stirred till the ammonium ceric nitrate is fully dissolved. Next, the reaction system is heated up to 70° C., and timing is started once the temperature in the reactor reaches 70° C.; after 4 h reaction, the reactor is cooled to 25° C. The product in the first stage shall be straw yellow transparent liquid.

(3) 5 kg 1-ethyl-3-(3-dimethyllaminopropyl) carbonyl diimine hydrochlide is added into the reaction system after cooling (5 kg 1-ethyl-3-(3-dimethyllaminopropyl) carbonyl diimine hydrochlide is divided into 5 parts, the reaction system is stirred for 15 min whenever a part is added, and then the next part is added, and so on, till all parts are added). Then, the solution is stirred for 12 h at room temperature, till the 1-ethyl-3-(3-dimethyllaminopropyl) carbodiie hydrochlide is dissolved fully. The product is still straw yellow transparent solution.

(4) 5 kg dopamine hydrochloride is added into the system after the 1-ethyl-3-(3-dimethylaminopropyl) carbonyl diimine hydrochlide is dissolved, and the system is stirred for 24 h at room temperature for reaction, till a final reaction product bionic wall bracing agent GBFS-1 is generated. The product is straw yellow liquid that has certain viscosity. It is tested that the weight-average molecular weight of the reaction product bionic wall bracing agent GBFS-1 is 84,320 g/mol.

Bionic Shale Inhibitor Preparation Example 1

0.5 mol (87.1 g) L-arginine and 0.2 mol (29.2 g) L-lysine are mixed and stirred at 195° C., 1.75 mol (171.5 g) phosphoric acid (85 wt. % phosphoric acid solution) is added into the mixture, and the mixture is held at 195° C. for 16 h for reaction. After the reaction is completed, 200 g water is added when the temperature drops to about 120° C., and then the mixture is stirred further for 20 min, till the product is fully dissolved in the water. Next, the water solution of the reaction product is taken out, and dried at about 120° C. to obtain solid; next, the solid is dissolved in dimethyl sulfoxide, and the insoluble substance is separated from the solution by suction filtration. Then, the solution is evaporated by rotary evaporation; thus, 91.8 g bionic shale inhibitor YZFS-1 is obtained. Measured by gel permeation chromatography, the weight-average molecular weight Mw is 1,551 g/mol, and the molecular weight distribution index is 1.465. Analyzed by $^1$H-NMR and $^{13}$C-NMR spectroscopy, the molar ratio of the structural units represented by formula (3) to the structural units represented by formula (4) in the obtained polymer is 2.47:1.

Emulsifier Preparation Example 1

(1) The reactants are mixed at a molar ratio of tetraethylene pentamine to linoleic acid=1:2.2 (i.e., the molar ratio of tetraethylene pentamine calculated by primary amine group to linoleic acid is 1:1.1), and stirred for 40 min At 250 r/min Stirring speed, then the pH of the obtained mixture is adjusted to 9, and the mixture is kept at 230° C. for reaction of 3 h, while water is separated with a water separator in the process, next, the product is cooled to room temperature;

(2) The reaction product in the step (1) is mixed with propandioic acid (the molar ratio of the tetraethylene pentamine to the propandioic acid is 1:0.6), then the pH of the obtained mixture is adjusted to 8, next, the mixture is stirred at 400 r/min at 90° C. for 6 h; thus, an emulsifier E1 is obtained. Detected and analyzed by infrared spectroscopy, $^1$H-NMR and $^{13}$C-NMR spectroscopy, the emulsifier E1 contains amido groups, unsaturated double bonds, and carboxyl groups, and is in a comb structure.

Reversal Agent Intermediate Preparation Example 1

0.12 mol N,N'-dimethyl-1,3-propylene diamine is dissolved in 250 mL dichloromethane at 0-5° C., 0.12 mol triethylamine is added, and the mixture is mixed and stirred for 30 min; then, 0.1 mol perfluoro-butyl sulfuryl fluoride is added by dropwise adding at 0-5° C. (added completely within about 30 min, purchased from Hubei Jusheng Technology Co., Ltd. with a trade mark 375-72-4), and the mixture is held at 0-5° C. for 60 min for reaction, and then is held at 25° C. for 4 h for reaction; the obtained product is filtered, the filter cake is washed with dichloromethane, dried, and then recrystallized with acetone; thus, 128.7 g white solid is obtained. Analysis by infrared, $^1$H-NMR and $^{13}$C-NMR spectroscopy, the solid is the compound represented by formula (b-2-1).

Reversal Agent Intermediate Preparation Example 2

0.12 mol N,N'-dimethyl-1,3-propylene diamine is dissolved in 250 mL dichloromethane at 0-5° C., 0.12 mol triethylamine is added, and the mixture is mixed and stirred for 30 min; then, 0.1 mol perfluoro-hexyl sulfuryl fluoride is added by dropwise adding at 0-5° C. (added completely within about 30 min, purchased from Hubei xinmingtai Chemical Co., Ltd. with a trade mark 423-50-7), and the mixture is held at 0-5° C. for 60 min For reaction, and then is held at 25° C. for 4 h for reaction; the obtained product is filtered, the filter cake is washed with dichloromethane, dried, and then recrystallized with acetone; thus, 125.3 g white solid is obtained. Analysis by infrared, $^1$H-NMR and $^{13}$C-NMR spectroscopy, the solid is the compound represented by formula (b-2-2).

Reversal Agent Intermediate Preparation Example 3

0.12 mol N,N'-dimethyl-1,3-propylene diamine is dissolved in 300 ml dichloromethane at 0-5° C., 0.12 mol triethylamine is added, and the mixture is mixed and stirred for 30 min; then, 0.1 mol perfluoro-octyl sulfuryl fluoride is added by dropwise adding at 0-5° C. (added completely within about 30 min, purchased from Shanghai Yijing Industrial Co., Ltd. with a trade mark 307-35-7), and the mixture is held at 0-5° C. for 60 min for reaction, and then is held at 25° C. for 4 h for reaction; the obtained product is filtered, the filter cake is washed with dichloromethane, dried, and then recrystallized with acetone; thus, 127.4 g white solid is obtained. Analysis by infrared, $^1$H-NMR and $^{13}$C-NMR spectroscopy, the solid is the compound represented by formula (b-2-3).

Amphiphobic Wettability Reversal Agent Preparation Example 1

10 mmol compound represented by formula (b-2-1) is dissolved in 50 mL ethanol at 65° C., and then 11 mmol 1,4-dibromobutane is added by dropwise adding (added completely within about 20 min), and the mixture is stirred for 6 h at 75° C. for reaction; the reaction product is cooled to room temperature (about 25° C.) for crystallization, and then is filtered, and the filter cake is washed and dried; thus, 12.34 g solid is obtained. Analyzed by infrared, $^1$H-NMR and $^{13}$C-NMR spectroscopy, the solid is the amphiphobic wettability reversal agent RA1 in which the groups represented by formula (a-1) are cations and bromine ions are anions.

Amphiphobic Wettability Reversal Agent Preparation Example 2

10 mmol compound represented by formula (b-2-2) is dissolved in 50 mL ethanol at 65° C., and then 11 mmol 1,4-dibromobutane is added by dropwise adding (added completely within about 20 min), and the mixture is stirred for 6 h at 75° C. for reaction; the reaction product is cooled to room temperature (about 25° C.) for crystallization, and then is filtered, and the filter cake is washed and dried; thus, 12.43 g solid is obtained. Analyzed by infrared, $^1$H-NMR and $^{13}$C-NMR spectroscopy, the solid is the amphiphobic wettability reversal agent RA2 in which the groups represented by formula (a-2) are cations and bromine ions are anions.

Amphiphobic Wettability Reversal Agent Preparation Example 3

10 mmol compound represented by formula (b-2-3) is dissolved in 60 mL isopropanol at 55° C., and then 12 mmol 1,4-dibromobutane is added by dropwise adding (added completely within about 20 min), and the mixture is stirred for 7 h at 85° C. for reaction; the reaction product is cooled to room temperature (about 25° C.) for crystallization, and then is filtered, and the filter cake is washed and dried; thus, 12.54 g solid is obtained. Analyzed by infrared, $^1$H-NMR and $^{13}$C-NMR spectroscopy, the solid is the amphiphobic wettability reversal agent RA3 in which the groups represented by formula (a-3) are cations and bromine ions are anions.

Amphiphobic Wettability Reversal Agent Preparation Example 4

The method described in the amphiphobic wettability reversal agent preparation example 1 is used, but 1,6-dibromo-hexane is used in replacement of 1,4-dibromobutane; finally, 11.87 g solid is obtained. Analyzed by infrared, $^1$H-NMR and $^{13}$C-NMR spectroscopy, the solid is the amphiphobic wettability reversal agent RA4 in which the groups represented by formula (a-4) are cations and bromine ions are anions.

Comparative Amphiphobic Wettability Reversal Agent Preparation Example 1

10 mmol compound represented by formula (b-2-3) is dissolved in 50 mL ethanol at 65° C., and then 11 mmol sodium 2-hydroxy-3-chloropropanesulfonate is added by dropwise adding (added completely within about 20 min), the pH is adjusted to 9 with sodium hydroxide solution, and the mixture is stirred for 6 h at 85° C. for reaction; the reaction product is cooled to room temperature (about 25° C.) for crystallization, and then is filtered, and the filter cake is washed and dried; thus, 10.54 g solid is obtained. Analyzed by infrared, $^1$H-NMR and $^{13}$C-NMR spectroscopy, the solid is amphiphobic wettability reversal agent DRA1 represented by formula

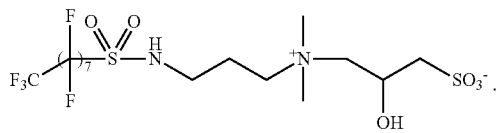

Test Case 1

1. Measurement of Amphiphobic Property of Rock Surface:
1 wt. % water solution of the amphiphobic wettability reversal agent is prepared as the fluid to be tested, 1 wt. % water solution of hexadecyl trimethyl ammonium bromide is prepared (as a comparative amphiphobic wettability reversal agent DRA2), 1 wt. % water solution of alkyl polyoxyethylene ether sulfate (purchased from Jiangsu Haian Petrochemical Plant) is prepared (as a comparative amphiphobic wettability reversal agent DRA3), and 1 wt. % water solution of nonyl phenol polyoxyethylene ether (purchased from Jiangsu Haian Petrochemical Plant) is prepared (as a comparative amphiphobic wettability reversal agent DRA4), respectively, and an artificial rock core is immersed in each of the solution for 8 h at 160° C.; the rock cores are taken out, and cooled and dried naturally, and then the contact angles $\theta_o$ and $\theta_w$ of oil phase and water phase on the surfaces of rock cores are measured with a contact angle meter (JC2000D3 contact angle meter from Shanghai Zhongchen Digital Technology and Equipment Co., Ltd.). The results are shown in Table 1, wherein, the oil phase test liquid is n-hexadecane, and the water phase test liquid is distilled water.

2. Surface Tension Test:

The surface tension is measured with a TX-500C full-range spinning drop interfacial tensiometer with a spinning drop method. The main process of the spinning drop method includes: the liquid to be tested is added in an appropriate amount into a sample tube (the above-mentioned amphiphobic wettability reversal agent and the amphiphobic wettability reversal agents in the comparative examples are dissolved in distilled water to prepare solutions at different concentrations, see table 1 for the details), a bubble in appropriate size is squeezed into the sample tube, so that gas and liquid phases are formed in the sample tube; then, the sample tube is centrifuged at a high rotation speed ω=7,000 r/min, so that the low-density bubble is elongated in the high-density solution under the actions of centrifugal force, gravity, and interfacial tension. The diameter of the elongated bubble is measured, and the surface tension in the state is calculated from the diameter and the given difference in density between the two phases; in addition, the measurement temperature is 25° C. The results are shown in Table 1.

3. Influence of Wettability on Dynamic Capillary Spontaneous Imbibition

A SWT rock core spontaneous water imbibition evaluation system from Jingzhou Modern Oil Technology Development Co., Ltd. is used, liquid-wetted rock core columns and gas-wetted rock core columns are prepared from dense rock cores with similar permeability respectively (the mass fraction of the amphiphobic wettability reversal agent is 2 wt. % in the treatment), and a spontaneous imbibition test is carried out at room temperature (about 25° C.); in the test, air is the gas phase, and saline water and kerosene are liquid phases, wherein, the saline water is 12 wt. % NaCl solution (with 1.07 g/cm$^3$ density), the density of kerosene is 0.78 g/cm$^3$. The dynamic conditions of spontaneous oil and water imbibition of the rock cores and the final degree of liquid saturation from spontaneous imbibition are logged respectively, and the gas permeability of the rock cores after spontaneous imbibition is tested (see Table 2 for the results).

TABLE 1

| Amphiphobic wettability reversal agent | $\theta_w/(°)$ | $\theta_o/(°)$ | Surface tension at different concentrations (mN/m) | | |
|---|---|---|---|---|---|
| | | | 0.05 wt. % | 0.10 wt.% | 0.20 wt.% |
| Distilled water | 0 | 0 | / | / | / |
| RA1 | 102.56 | 75.99 | 16.4 | 16.4 | 16.4 |
| RA2 | 104.32 | 74.68 | 16.5 | 16.4 | 16.4 |
| RA3 | 103.21 | 73.86 | 16.4 | 16.5 | 16.4 |
| RA4 | 105.02 | 75.45 | 16.5 | 16.4 | 16.5 |
| DRA1 | 92.56 | 69.12 | 20.2 | 20.2 | 20.1 |
| DRA2 | 76.23 | 48.82 | 38.1 | 38.2 | 38.1 |

TABLE 1-continued

| Amphiphobic wettability reversal agent | $\theta_w/(°)$ | $\theta_o/(°)$ | Surface tension at different concentrations (mN/m) | | |
|---|---|---|---|---|---|
| | | | 0.05 wt.% | 0.10 wt.% | 0.20 wt.% |
| DRA3 | 75.66 | 49.54 | 38.2 | 38.1 | 38.1 |
| DRA4 | 77.14 | 49.08 | 38.1 | 38.1 | 38.1 |

It is seen from the results in Table 1: the amphiphobic wettability reversal agent provided in the present invention makes the rock surface amphiphobic, wherein, the water wetting angle is up to 100° or above, and the n-hexadecane wetting angle is up to 70° or above; in addition, the surface tension is decreased.

TABLE 2

| Agent | $V_P$ | $m_0$ | Liquid | m (single) | s (single) | m (reverse) | s (reverse) |
|---|---|---|---|---|---|---|---|
| Blank | 1.875 | 69.38 | Saline water | 70.55 | 62.47 | 70.90 | 81.12 |
| | 1.757 | 68.69 | Kerosene | 69.53 | 59.75 | 69.81 | 79.43 |
| RA1 | 1.744 | 68.53 | Saline water | 68.79 | 18.84 | 68.90 | 26.34 |
| | 1.704 | 68.07 | Kerosene | 68.31 | 17.24 | 68.51 | 32.16 |
| RA2 | 1.742 | 68.51 | Saline water | 68.83 | 18.62 | 68.87 | 26.03 |
| | 1.704 | 68.05 | Kerosene | 68.28 | 17.12 | 68.49 | 31.95 |
| RA3 | 1.748 | 68.51 | Saline water | 68.77 | 18.89 | 68.88 | 26.41 |
| | 1.706 | 68.05 | Kerosene | 68.29 | 17.28 | 68.49 | 32.22 |
| RA4 | 1.738 | 68.42 | Saline water | 68.68 | 18.76 | 68.78 | 26.25 |
| | 1.702 | 68.02 | Kerosene | 68.25 | 17.18 | 68.46 | 32.13 |
| DRA1 | 1.756 | 68.52 | Saline water | 68.80 | 19.79 | 69.03 | 36.45 |
| | 1.712 | 68.12 | Kerosene | 68.37 | 18.16 | 68.71 | 42.83 |
| DRA2 | 1.795 | 68.84 | Saline water | 69.22 | 26.44 | 69.39 | 38.21 |
| | 1.722 | 68.47 | Kerosene | 68.81 | 24.95 | 69.07 | 43.48 |
| DRA3 | 1.798 | 68.84 | Saline water | 69.22 | 26.43 | 69.38 | 37.46 |
| | 1.722 | 68.46 | Kerosene | 68.80 | 24.93 | 69.05 | 43.04 |
| DRA4 | 1.798 | 68.84 | Saline water | 69.22 | 26.45 | 69.38 | 37.47 |
| | 1.724 | 68.46 | Kerosene | 68.80 | 24.94 | 69.05 | 43.03 |

Note:
"blank" represents no amphiphobic agent; "VP" represents volume of permeation; "m0" represents mass of permeation; "m(single)" represents rock core mass after spontaneous imbibition in single direction; "s(single)" represents degree of liquid saturation in the rock core after spontaneous imbibition in single direction; "m(reverse)" represents rock core mass after spontaneous imbibition in reverse direction; "s(reverse)" represents degree of liquid saturation in the rock core after spontaneous imbibition in reverse direction.

It is seen from Table 2: after the dual-cation fluorocarbon surfactant obtained in the present invention is added as an amphiphobic wettability reversal agent, all of the "$V_p$", "$M_0$", "m(single)", "s(single)", "m(reverse)", and "s(reverse)" are decreased, indicating that the dual-cation fluorocarbon surfactant obtained in the present invention has a favorable amphiphobic effect.

Example 1

This example is provided to describe the water-based drilling fluid in the present invention.

The formulation is: 100 pbw water, 2 pbw modified silicon dioxide nano-particle S1, 1 pbw bionic wall bracing agent GBFS-1, 1 pbw bionic shale inhibitor YZFS-1, 3 pbw emulsifier E1, 0.1 pbw amphiphobic wettability reversal agent RA1, 3 pbw filler, 0.2 pbw potassium polyacrylamide (K-PAM purchased from Renqiu Hongze petrochemical industry Co., Ltd., the same below), 3 pbw modified starch (LYS purchased from Shandung Deshunyuan Petroleum Sci. & Tech. Co., Ltd., the same below), 3 pbw potassium humate (KHM purchased from Beijing Shida Bocheng Technology Co., Ltd.), 15 pbw organic salt (GD-WT organic sodium salt purchased from Hebei Guangda Petrochemical Co., Ltd., the same below), 2 pbw lubricant (trade mark FHGT-G modified phospholipid purchased from Shanghai Youchuang Industrial Co., Ltd.), 330 pbw barite (ZR-43 barite purchased from Sichuan Zhengrong Industrial Co., Ltd.); thus, a drilling fluid Y1 is prepared.

Example 2

This example is provided to describe the environment-friendly water-based drilling fluid in the present invention.

The formulation described in the example 1 is used, but modified silicon dioxide nano-particles S2 are used in replacement of the modified silicon dioxide nano-particles S1; thus, a drilling fluid Y2 is prepared.

Example 3

This example is provided to describe the environment-friendly water-based drilling fluid in the present invention.

The formulation described in the example 1 is used, but the amount of the modified silicon dioxide nano-particle S1 is 1 pbw, the amount of the bionic wall bracing agent GBFS-1 is 2 pbw, and the amount of the bionic shale inhibitor YZFS-1 is 2 pbw; thus, a drilling fluid Y3 is prepared.

Comparative Example 1

The formulation described in the example 1 is used, but the modified silicon dioxide nano-particles DS1 are used in replacement of the modified silicon dioxide nano-particles S1, and the emulsifier E1 and amphiphobic wettability reversal agent RA1 are not used; thus, a drilling fluid DY1 is prepared.

Comparative Example 2

The formulation described in the example 1 is used, but the modified silicon dioxide nano-particles DS2 are used in replacement of the modified silicon dioxide nano-particles S1, and the emulsifier E1 and amphiphobic wettability reversal agent RA1 are not used; thus, a drilling fluid DY2 is prepared.

Comparative Example 3

The formulation described in the example 1 is used, but unmodified silicon dioxide nano-particles (TSP purchased from Nanjing Tianxing New Materials Co., Ltd., the particle diameter is about 20 nm) are used in replacement of the modified silicon dioxide nano-particles S1, and the emulsifier E1 and amphiphobic wettability reversal agent RA1 are not used; thus, a drilling fluid DY3 is prepared.

Comparative Example 4

The formulation described in the example 1 is used, but the bionic wall bracing agent GBFS-1, emulsifier E1 and amphiphobic wettability reversal agent RA1 are not used; thus, a drilling fluid DY4 is prepared.

Comparative Example 5

The formulation described in the example 1 is used, but 1 pbw small cations (CSM-1 purchased from Tianjian Petroleum Technology Co., Ltd.) are used in replacement of the bionic shale inhibitor YZFS-1, and the emulsifier E1 and amphiphobic wettability reversal agent RA1 are not used; thus, a drilling fluid DY5 is prepared.

Test Case 2

Testing basic properties of the drilling fluids: the drilling fluids Y1-Y3 and DY1-DY5 are tested at room temperature without hot aging and after hot aging at 120° C. for 16 h respectively, to test their plastic viscosity (PV), apparent viscosity (AV), yield point (YP), ratio of yield point to plastic viscosity, gel strength (GEL, i.e., initial gel strength/final gel strength), API filtration (API), high-temperature and high-pressure filtration (HTHL), density, and ph. The results are shown in Table 3, wherein:

The GEL strength refers to the strength of the gel structure formed after the drilling fluid enters into a still state, i.e., the ratio of initial gel strength to final gel strength, in unit of Pa/Pa; wherein, the initial gel strength and final gel strength are measured with a FANN six-speed viscosity meter with the method specified in the national standard GB/T29170-2012:

Initial_Gel_Strength=$0.511\theta_3$(10 s)
Final_Gel_Strength=$0.511\theta_3$(10 min).

API refers to intermediate pressure filter loss, and is measured with an API filter loss meter with the method specified in the standard SY/T5621-93, in unit of mL.

HTHP refers to high-temperature and high-pressure filter loss, and is measured with a HTHP filter loss meter with the method specified in the national standard GB/T29170-2012, in unit of mL.

TABLE 3

| Drilling Fluid | AV mPa·s | PV mPa·s | YP Pa | Ratio of yield point to plastic viscosity | GEL Pa/Pa | API mL | HTHP mL | Density g/cm³ | pH |
|---|---|---|---|---|---|---|---|---|---|
| Before hot aging ||||||||||
| Y1 | 122 | 101 | 21 | 0.21 | 4/19 | / | / | 2.3 | 9 |
| Y2 | 119 | 103 | 16 | 0.26 | 4.5/17 | / | / | 2.3 | 9 |
| Y3 | 120 | 102 | 18 | 0.22 | 4/18 | / | / | 2.3 | 9 |
| DY1 | 126 | 114 | 12 | 0.11 | 4/23 | / | / | 2.3 | 9 |
| DY2 | 130 | 118 | 12 | 0.10 | 4/22 | / | / | 2.30 | 9 |
| DY3 | 138 | 128 | 10 | 0.08 | 5/23 | / | / | 2.30 | 9 |
| DY4 | 115 | 103 | 12 | 0.12 | 3/18 | / | / | 2.3 | 9 |
| DY5 | 116 | 104 | 12 | 0.12 | 3/17 | / | / | 2.3 | 9 |
| After hot aging at 120° C. for 16 h ||||||||||
| Y1 | 103 | 87 | 16 | 0.18 | 3/14 | 0.6 | 3.0 | 2.31 | 9 |
| Y2 | 102 | 85 | 17 | 0.2 | 3/13 | 0.4 | 2.8 | 2.31 | 9 |
| Y3 | 102 | 86 | 16 | 0.19 | 3/13 | 0.7 | 3.0 | 2.31 | 9 |
| DY1 | 103 | 92 | 11 | 0.12 | 3.5/15 | 1.2 | 6.0 | 2.31 | 9 |
| DY2 | 105 | 95 | 10 | 0.11 | 4/15 | 1.2 | 6.8 | 2.32 | 9 |
| DY3 | 107 | 98 | 9 | 0.09 | 4/16 | 1.6 | 8.4 | 2.32 | 9 |
| DY4 | 96 | 86 | 10 | 0.12 | 3/14 | 1.0 | 5.2 | 2.31 | 9 |
| DY5 | 95 | 86 | 9 | 0.10 | 3/12 | 1.4 | 6.2 | 2.31 | 9 |

Note:
"/" represents "not tested".

The plastic viscosity (PV) is measured with a FANN six-speed viscosity meter with the method specified in the national standard GB/T29170-2012, in unit of mpa·s, PV=$\theta_{600}-\theta_{300}$.

The apparent viscosity (AV) is measured with a FANN six-speed viscosity meter with the method specified in the national standard GB/T29170-2012, in unit of mpa·s, $$AV = \frac{1}{2}\theta_{600}.$$

The yield point (YP) is measured with a FANN six-speed viscosity meter with the method specified in the national standard GB/T29170-2012, YP=$0.511\times(2\times\phi300-\phi600)$, in unit of Pa. The ratio of yield point to plastic viscosity is $$\frac{YP}{\varphi 600 - \varphi 300},$$

where, φ600 and φ300 are read with a six-speed viscosity meter in sequence.

It is seen from Table 3: though the density is high and the system has high barite content, the drilling fluid system provided in the present invention still has a good ratio of yield point to plastic viscosity, and both the API filter loss and the HTHP filter loss are low. However, in case the nano-plugging agent, bionic wall bracing agent and bionic inhibitor in the drilling fluid system are replaced and the emulsifier and amphiphobic wettability reversal agent are not used, the ratio of yield point to plastic viscosity of the obtained drilling fluid system (e.g., reference examples DY1-DY5) begin to decrease, indicating that the rheological property of the system becomes poor; in addition, the API filter loss and HTHP filter loss become higher, which is adverse to well wall stability.

Test Case 3

The steps of hot-aging recovery rate test are mainly as follows: 350 mL test solution (tap water and above-mentioned drilling fluids respectively) is loaded into an aging can, 50 g mud shale debris of 6-10 mesh is weighed, loaded into a roller hearth, and rolled at 120° C. for 16 h for dispersion; then, the recovered rock sample is screen through a 40 mesh screen in water to clean state, and the residual rock sample is loaded into a watch glass, and then is dried in an oven at 105° C. to constant weight; the weight is measured, and the hot-aging recovery rate is calculated with the following formula (the result is shown in Table 4):

$$S = M/50 \times 100\%$$

where, S—recovery rate after screening through a 40 mesh screen, %; M—screen residue after screening though the 40 mesh screen, g.

TABLE 4

| Test solution | Hot-aging recovery rate/% |
| --- | --- |
| Tap water | 18.62 |
| Drilling fluid Y1 | 99.44 |
| Drilling fluid Y2 | 99.32 |
| Drilling fluid Y3 | 99.57 |
| Drilling fluid DY1 | 91.68 |
| Drilling fluid DY2 | 92.12 |
| Drilling fluid DY3 | 90.56 |
| Drilling fluid DY4 | 74.18 |
| Drilling fluid DY5 | 80.56 |

It is seen from Table 4: with the drilling fluid system provided in the present invention, all of the hot-aging recovery rates of rock cuttings are 99% or higher, indicating the system has a good inhibition effect against mud shale; in case the nano-plugging agent, bionic wall bracing agent and bionic inhibitor in the drilling fluid system are replaced and the emulsifier and amphiphobic wettability reversal agent are not used, the hot-aging recovery rates attained with the obtained drilling fluid systems (e.g., reference examples DY1-DY5) are severely decreased, and the inhibition performance is poor.

Test Case 4

The swelling property is measured with a dual-channel shale swelling tester with the method specified in SY/T5613-2000. The result is shown in Table 5. The steps of the test are mainly as follows:

1. Preparation of rock core: 10 g sodium bentonite dried at 105° C.±2° C. is weighed and loaded into a test cylinder, and a plug rod is inserted into the test cylinder and held for 5 min at 10 MPa pressure.
2. Blank test: the test cylinder with the rock core is mounted on the shale swelling tester, distilled water is injected into the test cylinder, and the rock core is soaked for 16 h. The linear swelling amount of the rock core is logged.
3. Measurement with test solution: the test cylinder with the rock core is mounted on the shale swelling tester, 20 mL drilling fluid is injected into the test cylinder, and the rock core is soaked for 16 h. The linear swelling amount of the rock core is logged, and the reduced rate of linear swelling is calculated with formula $$B = \frac{\Delta H_1 - \Delta H_2}{\Delta H_1} \times 100\%,$$

where,
B—reduced rate of linear swelling of rock core, in unit of percent (%);
$\Delta H_1$—linear swelling amount of the rock core after soaked in distilled water for 16 h (i.e., increased height of rock core), in unit of millimeter (mm);
$\Delta H_2$—linear swelling amount of the rock core after soaked in the test solution for 16 h (i.e., increased height of rock core), in unit of millimeter (mm).

TABLE 5

| Test solution | Increased height of rock core/mm | Reduced rate of linear swelling/% |
| --- | --- | --- |
| Tap water | 8.76 | / |
| Drilling fluid Y1 | 0.72 | 91.78 |
| Drilling fluid Y2 | 0.74 | 91.55 |
| Drilling fluid Y3 | 0.69 | 92.12 |
| Drilling fluid DY1 | 1.22 | 84.51 |
| Drilling fluid DY2 | 1.32 | 84.93 |
| Drilling fluid DY3 | 1.43 | 83.68 |
| Drilling fluid DY4 | 2.17 | 75.23 |
| Drilling fluid DY5 | 1.98 | 77.4 |

It is seen from Table 5: with the drilling fluid system provided in the present invention, all of the reduced rates of linear swelling are 90% or higher, indicating the system has a good inhibition effect; when the nano-plugging agent, bionic wall bracing agent and bionic inhibitor in the drilling fluid system are replaced and the emulsifier and hydrophobic and oileophobic wettability reversal agent are not reused, the swelling inhibition index of the obtained drilling fluid systems (e.g., reference examples DY1-DY5) is severely compromised, and the inhibition performance is poor.

While some preferred embodiments of the present invention are described above, the present invention is not limited to the details in those embodiments. Those skilled in the art can make modifications and variations to the technical scheme of the present invention, without departing from the spirit of the present invention. However, all these modifications and variations shall be deemed as falling into the protected scope of the present invention.

In addition, it should be noted that the specific technical features described in above embodiments can be combined in any appropriate form, provided that there is no conflict. To avoid unnecessary repetition, the possible combinations are not described specifically in the present invention.

Moreover, different embodiments of the present invention can be combined freely as required, as long as the combinations don't deviate from the ideal and spirit of the present invention. However, such combinations shall also be deemed as falling into the scope disclosed in the present invention.

The invention claimed is:

1. A water-based drilling fluid comprising
   a nano-plugging agent,
   a bionic wall bracing agent,
   a bionic shale inhibitor,
   a filler,
   an emulsifier, and
   an amphiphobic wettability reversal agent,
   wherein the nano-plugging agent is modified silicon dioxide nano-particle including a modifying group, the modifying group on the modified silicon dioxide nano-particle includes a modifying copolymer chain, and the structural units in the modifying copolymer chains are provided by one or more of monomers represented by formula (1) and one or more of monomers represented by formula (2):

formula (1)

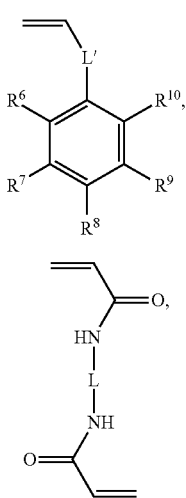

formula (2)

wherein one of $R^6$-$R^{10}$ is -L''-$SO_3H$ and the rest of $R^6$-$R^{10}$ are independently selected from H, —OH, halogen, and C1-C10 alkyl; L, L' and L'' are independently selected from C0-C10 alkylene;

wherein the bionic wall bracing agent is carboxymethyl chitosan with a dopamine-derived group represented by the following formula (I-1) grafted on its main chain:

formula (I-1)

—NH—$CH_2$—$CH_2$—

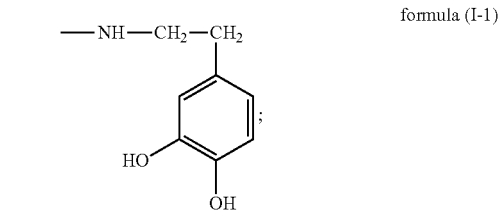

the bionic shale inhibitor is composed of structural units represented by the following formula (3) and structural units represented by the following formula (4):

formula (3)

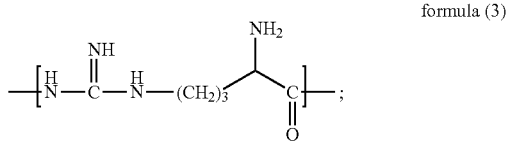

formula (4)

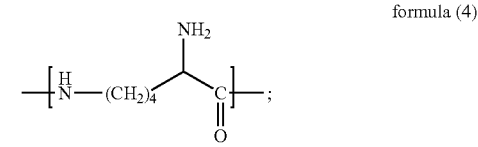

wherein the molar ratio of the structural units represented by formula (3) to the structural units represented by formula (4) is 0.2-6:1, and the weight-average molecular weight of the bionic shale inhibitor is 800-4,000 g/mol;

wherein the filler consists of calcium carbonate of 1,600-2,500 mesh, calcium carbonate of 1,050-1,500 mesh, and calcium carbonate of 500-1,000 mesh at a weight ratio of 1:0.55-6:0.55-6;

the emulsifier is one or more of compounds represented by the following formula (i):

formula (i)

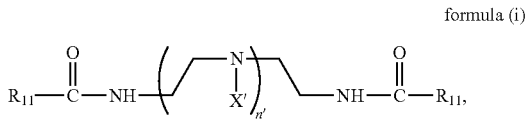

in formula (i), each of the two $R_{11}$ groups is independently selected from C14-C30 alkyl optionally substituted by group Y and C14-C30 unsaturated alkyl with carbon-carbon double bonds optionally substituted by group Y, and the group Y is independently selected from the groups represented by the following formulae:

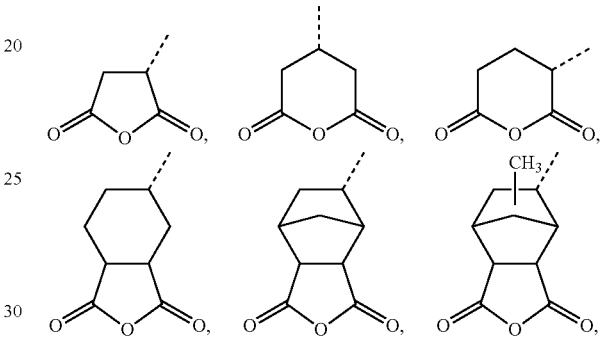

n' is an integer within a range of 1-8;

wherein n' X'-es are independently selected from H and —C(O)—$R_{21}$, and at least one X' is —C(O)—$R_{21}$, $R_{21}$ is selected from carboxyl, C1-C6 alkyl, C3-C8 cycloalkyl, C1-C6 alkyl substituted by carboxyl, C3-C8 cycloalkyl substituted by carboxyl, C3-C8 cycloalkyl substituted by carboxyl and C1-C4 alkyl, C2-C6 unsaturated alkyl with a carbon-carbon double bond, C3-C8 unsaturated cycloalkyl with a carbon-carbon double bond, C2-C6 unsaturated alkyl with a carbon-carbon double bond substituted by carboxyl, and C3-C8 unsaturated cycloalkyl with a carbon-carbon double bond substituted by carboxyl and C1-C4 alkyl; and wherein the amphiphobic wettability reversal agent is a dual-cation fluorocarbon surfactant of which the cation part is represented by the following formula (a):

formula (a)

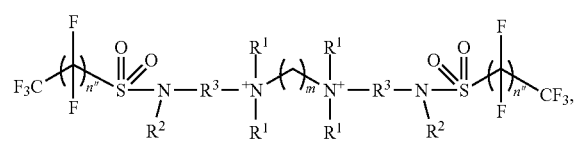

wherein, each $R^1$ is independently selected from C1-C6 alkyl, each $R^2$ is independently selected from H and C1-C6 alkyl, each $R^3$ is independently selected from C1-C10 alkylene, each n'' is independently selected from integers within a range of 3-15, and m is selected from integers within a range of 1-10.

2. The drilling fluid according to claim 1, wherein the weight ratio of the nano-plugging agent to the bionic wall bracing agent to the bionic shale inhibitor to the emulsifier to the amphiphobic wettability reversal agent is 100:20-500:20-500:20-500:5-100.

3. The drilling fluid according to claim 2, wherein the weight ratio of the nano-plugging agent to the bionic wall bracing agent to the bionic shale inhibitor to the emulsifier to the amphiphobic wettability reversal agent is 100:30-400:30-400:30-300:10-50.

4. The drilling fluid according to claim 1, wherein the structural units in the modifying copolymer chain is composed of one or more of structural units represented by the following formula (1-a) and one or more of structural units represented by the following formula (2-a):

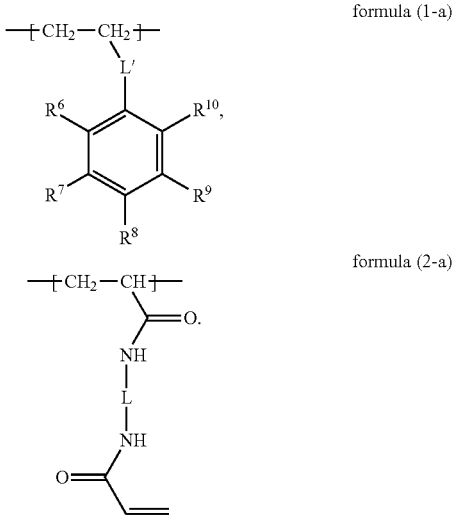

5. The drilling fluid according to claim 1, wherein one of $R^6$-$R^{10}$ is -L"-$SO_3$H, and the rest of $R^6$-$R^{10}$ are independently selected from H, and C1-C6 alkyl; L, L' and L" are independently selected from C0-C6 alkylene.

6. The drilling fluid according to claim 5, wherein one of $R^6$-$R^{10}$ is -L"-$SO_3$H, and the rest of $R^6$-$R^{10}$ are independently selected from H, and C1-C4 alkyl; L, L' and L" are independently selected from C0-C4 alkylene.

7. The drilling fluid according to claim 6, wherein one of $R^6$-$R^{10}$ is -L"-$SO_3$H, and the rest of $R^6$-$R^{10}$ are independently selected from H, methyl, ethyl, propyl and butyl; L' and L" are independently selected from C0 alkylene, —$CH_2$—, —$CH_2$—$CH_2$—, —$CH_2$—$CH_2$—$CH_2$—, —CH($CH_3$)—$CH_2$—, —C($CH_3$)$_2$—$CH_2$—, —$CH_2$—C($CH_3$)$_2$— and —$CH_2$—CH$CH_3$—$CH_2$—; L is —$CH_2$—, —$CH_2$—$CH_2$—, —$CH_2$—$CH_2$—$CH_2$—, —CH($CH_3$)—$CH_2$—, —C($CH_3$)$_2$—$CH_2$—, —$CH_2$—C($CH_3$)$_2$— or —$CH_2$—CH$CH_3$—$CH_2$—.

8. The drilling fluid according to claim 5, wherein in the modifying copolymer chain, the molar ratio of the structural units provided by the monomers represented by formula (1) to the structural units provided by the monomers represented by formula (2) is 1:0.5-5; the weight-average molecular weight of the modifying copolymer chain is 100,000-2,500,000 g/mol.

9. The drilling fluid according to claim 8, wherein in the modifying copolymer chain, the molar ratio of the structural units provided by the monomers represented by formula (1) to the structural units provided by the monomers represented by formula (2) is 1:1-2; the weight-average molecular weight of the modifying copolymer chain is 300,000-1,800,000 g/mol.

10. The drilling fluid according to claim 8, wherein based on the total weight of the modified silicon dioxide nano-particle, the content of the modifying copolymer chain is 60 wt. % or higher; the particle diameter of the modified silicon dioxide nano-particle is 3-30 nm.

11. The drilling fluid according to claim 1, wherein the bionic wall bracing agent contains structural units represented by the following formula (I):

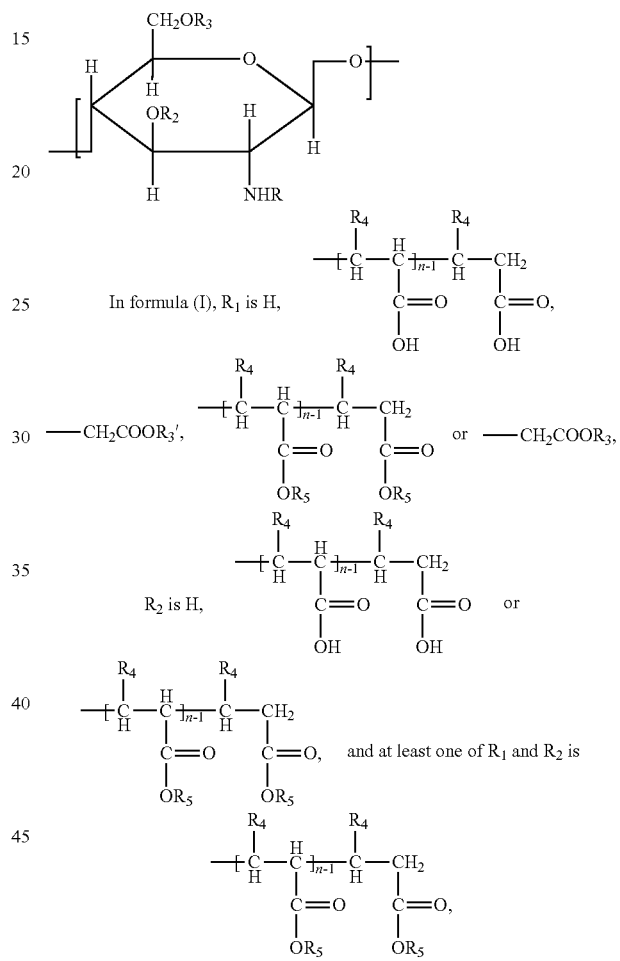

n is equal to or greater than 1, each of the n $R_5$ groups is H or the dopamine-derived group respectively and independently, and at least one of the n $R_5$ groups is the dopamine-derived group, $R_4$ is H or $C_1$-$C_{10}$ alkyl, R''' is H, —$CH_2COOR_3$' or —$CH_2COOR_3$, and $R_1$ and R''' are not H at the same time, $R_3$' is H or alkali metal, and $R_3$ is the dopamine-derived group.

12. The drilling fluid according to claim 1, wherein the filler consists of calcium carbonate of 1,900-2,200 mesh, calcium carbonate of 1,000-1,240 mesh, and calcium carbonate of 720-920 mesh at a weight ratio of 1:1-2:1-2.

13. The drilling fluid according to claim 1, wherein in formula (i), each of the two $R_{11}$ groups is independently selected from C14-C20 alkyl optionally substituted by group Y and C14-C20 unsaturated alkyl with carbon-carbon double bonds optionally substituted by group Y; n' is 1-6;

$R_{21}$ is selected from carboxyl, C1-C4 alkyl, C4-C6 cycloalkyl, C1-C4 alkyl substituted by carboxyl, C4-C6 cycloalkyl substituted by carboxyl, C4-C6 cycloalkyl substituted by carboxyl and methyl, C2-C4 unsaturated alkyl with a carbon-carbon double bond, C4-C6 unsaturated cycloalkyl with a carbon-carbon double bond, C2-C4 unsaturated alkyl with a carbon-carbon double bond substituted by carboxyl, and C4-C7 unsaturated cycloalkyl with a carbon-carbon double bond substituted by carboxyl and methyl.

14. The drilling fluid according to claim 13, wherein in formula (i), each of the two $R_{11}$ groups is independently selected from C15-C18 alkyl optionally substituted by group Y and C15-C18 unsaturated alkyl with carbon-carbon double bonds optionally substituted by group Y; n' is 1-4.

15. The drilling fluid according to claim 1, wherein in formula (a), each $R^1$ is independently selected from C1-C4 alkyl, each $R^2$ is independently selected from H and C1-C4 alkyl, each $R^3$ is independently selected from C2-C8 alkylene, each n" is independently selected from 4-10, and m is selected from 2-8.

16. The drilling fluid according to claim 15, wherein in formula (a), each $R^1$ is independently selected from methyl, ethyl, n-propyl, isopropyl, and n-butyl, each $R^2$ is independently selected from H, methyl, ethyl, n-propyl, isopropyl, and n-butyl, each $R^3$ is independently selected from $-CH_2-CH_2-$, $-CH_2-CH_2-CH_2-$, $-CH(CH_3)-CH_2-$, $-CH_2-CH(CH_3)-$, $-CH_2-(CH_2)_2-CH_2-$, $-CH_2-(CH_2)_3-CH_2-$, and $-CH_2-(CH_2)_4-CH_2-$, each n" is independently 4-8 and 8, and m is 3-6.

17. The drilling fluid according to claim 1, wherein the cation part shown in formula (a) is one of the following cations:
formula (a-1): in formula (a), each $R^1$ is methyl, each $R^2$ is H, each $R^3$ is $-CH_2-CH_2-CH_2-$, each n" is 4, and m is 4;
formula (a-2): in formula (a), each $R^1$ is methyl, each $R^2$ is H, each $R^3$ is $-CH_2-CH_2-CH_2-$, each n" is 6, and m is 4;
formula (a-3): in formula (a), each $R^1$ is methyl, each $R^2$ is H, each $R^3$ is $-CH_2-CH_2-CH_2-$, each n" is 8, and m is 4;
formula (a-4): in formula (a), each $R^1$ is methyl, each $R^2$ is H, each $R^3$ is $-CH_2-CH_2-CH_2-$, each n" is 4, and m is 6.

18. The drilling fluid according to claim 1, wherein with respect to 100 pbw water in the drilling fluid, the total content of the nano-plugging agent, bionic wall bracing agent, bionic shale inhibitor, emulsifier and amphiphobic wettability reversal agent is 20 pbw or lower.

19. The drilling fluid according to claim 1, wherein with respect to 100 pbw water in the drilling fluid, the content of the filler is 1-5 pbw.

20. The drilling fluid according to claim 1, wherein the density of the drilling fluid is 2.3 g/m$^3$ or higher.

* * * * *